(12) United States Patent
Tinnakornsrisuphap et al.

(10) Patent No.: US 8,792,646 B2
(45) Date of Patent: Jul. 29, 2014

(54) SYSTEMS AND METHODS FOR GROUP KEY DISTRIBUTION AND MANAGEMENT FOR WIRELESS COMMUNICATIONS SYSTEMS

(75) Inventors: Peerapol Tinnakornsrisuphap, San Diego, CA (US); Fatih Ulupinar, San Diego, CA (US); Parag Arun Agashe, San Diego, CA (US); Ravindra Patwardhan, San Diego, CA (US); Rajat Prakash, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 12/055,200

(22) Filed: Mar. 25, 2008

(65) Prior Publication Data

US 2009/0245517 A1 Oct. 1, 2009

(51) Int. Cl.
*H04L 9/08* (2006.01)
*H04L 29/06* (2006.01)
*H04W 12/04* (2009.01)

(52) U.S. Cl.
CPC ............ *H04L 63/065* (2013.01); *H04L 9/0833* (2013.01); *H04W 12/04* (2013.01)
USPC ............... 380/278; 380/28; 380/44; 713/153; 713/171; 713/189

(58) Field of Classification Search
CPC ...................................................... H04L 63/065
USPC .............. 380/277, 28, 44, 278; 713/153, 171, 713/189
See application file for complete search history.

(56) References Cited

U.S. PATENT DOCUMENTS

| 7,275,157 | B2 | 9/2007 | Cam Winget |
| 8,098,818 | B2 | 1/2012 | Grilli et al. |
| 2004/0014422 | A1 * | 1/2004 | Kallio .......................... 455/41.1 |
| 2004/0240412 | A1 * | 12/2004 | Winget .......................... 370/331 |
| 2005/0123141 | A1 * | 6/2005 | Suzuki .......................... 380/277 |

(Continued)

FOREIGN PATENT DOCUMENTS

| CN | 1836404 A | 9/2006 |
| CN | 101090315 A | 12/2007 |

(Continued)

OTHER PUBLICATIONS

International Search Report and Written Opinion—PCT/US2009/038128, International Search Authority—European Patent Office—Jan. 19, 2010 (061934).

(Continued)

*Primary Examiner* — Shewaye Gelagay
(74) *Attorney, Agent, or Firm* — Won Tae Kim

(57) ABSTRACT

A novel group key distribution and management scheme for broadcast message security is provided that allows an access terminal to send a single copy of a broadcast message encrypted with a group key. Access nodes that are members of an active set of access nodes for the access terminal may decrypt and understand the message. The group key is generated and distributed by the access terminal to the access nodes in its active set using temporary unicast keys to secure the group key during distribution. A new group key is provided every time an access node is removed from the active set of access nodes for the access terminal.

55 Claims, 15 Drawing Sheets

(56) References Cited

U.S. PATENT DOCUMENTS

| | | |
|---|---|---|
| 2006/0274644 A1 | 12/2006 | Budampati et al. |
| 2007/0070959 A1* | 3/2007 | Almeroth et al. ............ 370/338 |
| 2007/0140163 A1* | 6/2007 | Meier et al. ................. 370/329 |
| 2008/0070577 A1 | 3/2008 | Narayanan et al. |

FOREIGN PATENT DOCUMENTS

| | | |
|---|---|---|
| EP | 1614273 A1 | 1/2006 |
| JP | 2000031955 A | 1/2000 |
| JP | 2002252607 A | 9/2002 |
| JP | 2009507402 A | 2/2009 |
| WO | 2006016260 A2 | 2/2006 |
| WO | 2006119281 A2 | 11/2006 |
| WO | WO-2006132984 A2 | 12/2006 |
| WO | 2008030705 A2 | 3/2008 |

OTHER PUBLICATIONS

Taiwan Search Report—TW098109799—TIPO—Jun. 27, 2013 (061934TW).

* cited by examiner

SYSTEMS AND METHODS FOR GROUP KEY DISTRIBUTION AND MANAGEMENT FOR WIRELESS COMMUNICATIONS SYSTEMS

BACKGROUND

1. Field

Various features pertain to wireless communication systems. At least one aspect pertains to a system and method for group key distribution and management for broadcast message security.

2. Background

Wireless communication networks enable communication devices to transmit and/or receive information while on the move. These wireless communication networks may be communicatively coupled to other public or private networks to enable the transfer of information to and from the mobile access terminal. Such communication networks typically include a plurality of access nodes (e.g., base stations) which provide wireless communication links to access terminals (e.g., mobile communication devices, mobile phones, wireless user terminals). The access nodes may be stationary (e.g., fixed to the ground) or mobile (e.g., mounted on satellites, etc.) and positioned to provide wide area coverage as the access terminal travels across different coverage areas.

In prior art centralized wireless network systems, a centralized network controller functions as the manager for authenticating a subscriber, establishing communications, and handing off a communication from a first access node to a second access node. The network controller typically controls a plurality of access nodes that provide service to one or more access terminals. When a handoff occurs between the access nodes, the access terminal maintains unique security keys with each access node with which it communicates. Consequently, additional over-the-air signaling may be needed from the access terminal to secure communications with each access node.

To provide greater flexibility, decentralized or distributive wireless communication network systems may be employed, where a centralized network controller is either eliminated or its role in managing communications is reduced. However, such decentralized wireless network architectures are susceptible to some security risks. For example, an access terminal may send a broadcast message, such as an air-interface message, to all access nodes in its active access node set. However, an attacker may forge a broadcast message and send the forged message to access nodes, but the access nodes are unable to verify the authenticity or identity of the sender of such broadcast message, creating a security risk.

Additionally, with a reduced role or elimination of a centralized network controller in a distributive wireless communication network system, securely handing off communications from one access node to another may create security risks.

In view of the above shortcomings of the prior art, the recipient of a broadcast message needs to be able to authenticate a broadcast message and the anchor access node needs to be able to verify that the requesting node is a currently valid member of the active set. Consequently, a method is needed that provides for a distributive group key management scheme where a group key is shared between the access terminal and the access nodes in the active set for the encryption/authentication of broadcast messages and backhaul messages between access nodes in the active set. In other words, a method is needed that allows an access terminal to broadcast a single copy of a message where only members of a group can decrypt and understand the message.

SUMMARY

One feature provides a system and method for generating, distributing, and managing a group key between an access terminal (e.g., mobile terminal, wireless user terminal, etc.) and one or more access nodes (e.g., base stations, etc.) in an active set associated with the access terminal. In particular, a method is provided for an access terminal to securely deliver the group key to the one or more access nodes. The group key may be generated and distributed by the access terminal to the access nodes in its active set. A new group key may be generated and distributed every time an access node is removed from the active set of trusted access nodes associated with the access terminal.

An access terminal is provided comprising a communication interface and a processor. The communication interface may be configured to communicate with at least one access node. The processor may be configured to (a) maintain an active set list of access nodes, (b) obtain a temporary unicast key for each access node in the active set, (c) generate a first group key for the active set, (d) encrypt the first group key with a first temporary unicast key for a first access node in the active set, and/or (e) send the encrypted first group key to the first access node. The processor may be further configured to: (a) encrypt the first group key with other temporary unicast keys for other access nodes in the active set, and/or (b) send each of the encrypted first group keys to a corresponding access node with which temporary unicast key it was encrypted. Each of the temporary unicast keys may be pairwise temporary unicast keys known to both the access terminal and a corresponding access node. The processor may be further configured to send a multi-cast message encrypted and/or signed with the first group key.

The processor may be further configured to: (a) scan for access nodes via the communication interface, (b) add one or more access nodes to the active set of access nodes as they are identified, and/or (c) establish unique temporary unicast keys with each of the access nodes as they are added to the active set.

The processor may be further configured to: (a) replace the first group key with a second group key when an access node is removed from its active set; and/or (b) distribute encrypted versions of the second group key to the access nodes in its active set, wherein the encrypted versions of the second group key are encrypted with the temporary unicast keys for each access node in the active set.

The processor may be further configured to: (a) select an access node from the active set as a current serving access node for wireless communication services via the communication interface, wherein wireless communications to and from the access terminal are routed via the serving access node, (b) determine whether a different access node in the active set can provide better wireless communication services than the current serving access node, and/or (c) switch communication services from the current serving access node to a new serving access node if the new serving access node provides better wireless communication services than the current serving access node.

A method operational on an access terminal is also provided. An active set list of access nodes is maintained by the access terminal. The access terminal may obtain a temporary unicast key for each access node in the active set and generate a first group key for the active set. The first group key may be encrypted with a first temporary unicast key for a first access node in the active set and the encrypted first group key is sent by the access terminal to the first access node. The method may further comprise sending a multi-cast message encrypted/signed with the first group key.

The method may further comprise: (a) encrypting the first group key with other temporary unicast keys for other access nodes in the active set; and/or (b) sending each of the encrypted first group keys to a corresponding access node with which temporary unicast key it was encrypted.

The method may further comprise: (a) scanning for access nodes, (b) adding one or more access nodes to the active set of access nodes as they are identified, and/or (c) establishing unique temporary unicast keys with each of the access nodes as they are added to the active set.

The method may further comprise: (a) replacing the first group key with a second group key when an access node is removed from its active set, and/or (b) distributing encrypted versions of the second group key to the access nodes in its active set, wherein the encrypted versions of the second group key are encrypted with the temporary unicast keys for each access node in the active set.

The method may further comprise: (a) selecting an access node from the active set as a current serving access node for wireless communication services, wherein wireless communications to and from the access terminal are routed via the serving access node, (b) determining whether a different access node in the active set can provide better wireless communication services than the current serving access node, and/or (c) switching communication services from the current serving access node to a new serving access node if the new serving access node provides better wireless communication services than the current serving access node.

Consequently, an access terminal is provided comprising: (a) means for maintaining an active set list of access nodes, (b) means for obtaining a temporary unicast key for each access node in the active set, (c) means for generating a first group key for the active set, (d) means for encrypting the first group key with a first temporary unicast key for a first access node in the active set, and/or (e) means for sending the encrypted first group key to the first access node.

The access terminal may further comprise: (a) means for encrypting the first group key with other temporary unicast keys for other access nodes in the active set, and/or (b) means for sending each of the encrypted first group keys to a corresponding access node with which temporary unicast key it was encrypted.

The access terminal may further comprise (a) means for scanning for access nodes, (b) means for adding one or more access nodes to the active set of access nodes as they are identified, and/or (c) means for establishing unique temporary unicast keys with each of the access nodes as they are added to the active set.

The access terminal may further comprise: (a) means for replacing the first group key with a second group key when an access node is removed from its active set; and/or (b) means for distributing encrypted versions of the second group key to the access nodes in its active set, wherein the encrypted versions of the second group key are encrypted with the temporary unicast keys for each access node in the active set.

The access terminal and/or method operational on the access terminal may also be implemented in software and/or a processor or processing circuit.

An access node is also provided comprising a wireless communication interface and a processing circuit. The wireless communication interface may be adapted to communicate with at least one access terminal. The processing circuit may be configured to (a) generate a temporary unicast key, (b) send the temporary unicast key to an access terminal to join an active set of access nodes for the access terminal, and/or (c) receive a group key associated with the active set of access nodes for the access terminal. The access node may further comprise a network communication interface for communicating with other access nodes, wherein a forwarded broadcast message is sent over the network communication interface. The processing circuit may be further configured to authenticate itself to an anchor access node using the group key.

The processing circuit may be further configured to: (a) receive a broadcast message from the access terminal which is encrypted with the group key, (b) decrypt the broadcast message using the group key, and/or (c) forward the broadcast message to other access nodes in the active set of access nodes for the access terminal.

The processing circuit may be further configured to: (a) receive a broadcast message from the access terminal which is signed with the group key; and/or (b) authenticating the broadcast message using the group key.

The processing circuit may be further configured to: (a) establish wireless communication services with the access terminal via the wireless communication interface to serve as a first serving access node for routing communications to and from the access terminal, (b) receive a request from the access terminal to handover the wireless communication services to a second serving access node, (c) terminate the wireless communication services with the access terminal, and/or (d) establish a data tunnel with an anchor access node for the access terminal via a network communication interface.

A method operational on an access node is also provided. A temporary unicast key is generated and sent to an access terminal to join an active set of access nodes for the access terminal. A group key associated with the active set of access nodes for the access terminal is received.

A broadcast message may be received from the access terminal, where the broadcast message is encrypted with the group key. The broadcast message may then be decrypted using the group key. The broadcast message may be forwarded to other access nodes in the active set of access nodes for the access terminal.

In an alternative method, the broadcast message is received from the access terminal, where the broadcast message is signed with the group key. The broadcast message may then be authenticated using the group key.

The method may further comprise (a) establishing wireless communication services with the access terminal via a wireless communication interface to serve as a first serving access node for routing communications to and from the access terminal, (b) receiving a request from the access terminal to handover the wireless communication services to a second serving access node, (c) terminating the wireless communication services with the access terminal, and/or (d) establishing a data tunnel with an anchor access node for the access terminal via a network communication interface. The access node may also authenticate itself to an anchor access node using the group key.

Consequently, an access node is provided, comprising: (a) means for generating a temporary unicast key, (b) means for sending the temporary unicast key to an access terminal via a wireless communication interface to join an active set of access nodes for the access terminal, (c) means for receiving a group key associated with the active set of access nodes for the access terminal, and/or (d) means for establishing wireless communication services with the access terminal to serve as a first serving access node for routing communications to and from the access terminal.

Additionally, the access node may further comprise: (a) means for receiving a multi-cast message from the access terminal which is encrypted with the group key, (b) means for decrypting the multi-cast message using the group key, and/or (c) means for forwarding the multi-cast message to other access nodes in the active set of access nodes for the access terminal.

The access node may further comprise: (a) means for receiving a request from the access terminal to handover the wireless communication services to a second serving access node; and/or (b) means for terminating the wireless communication services with the access terminal.

The access node and/or method operational on the access node may also be implemented in software and/or a processor or processing circuit.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
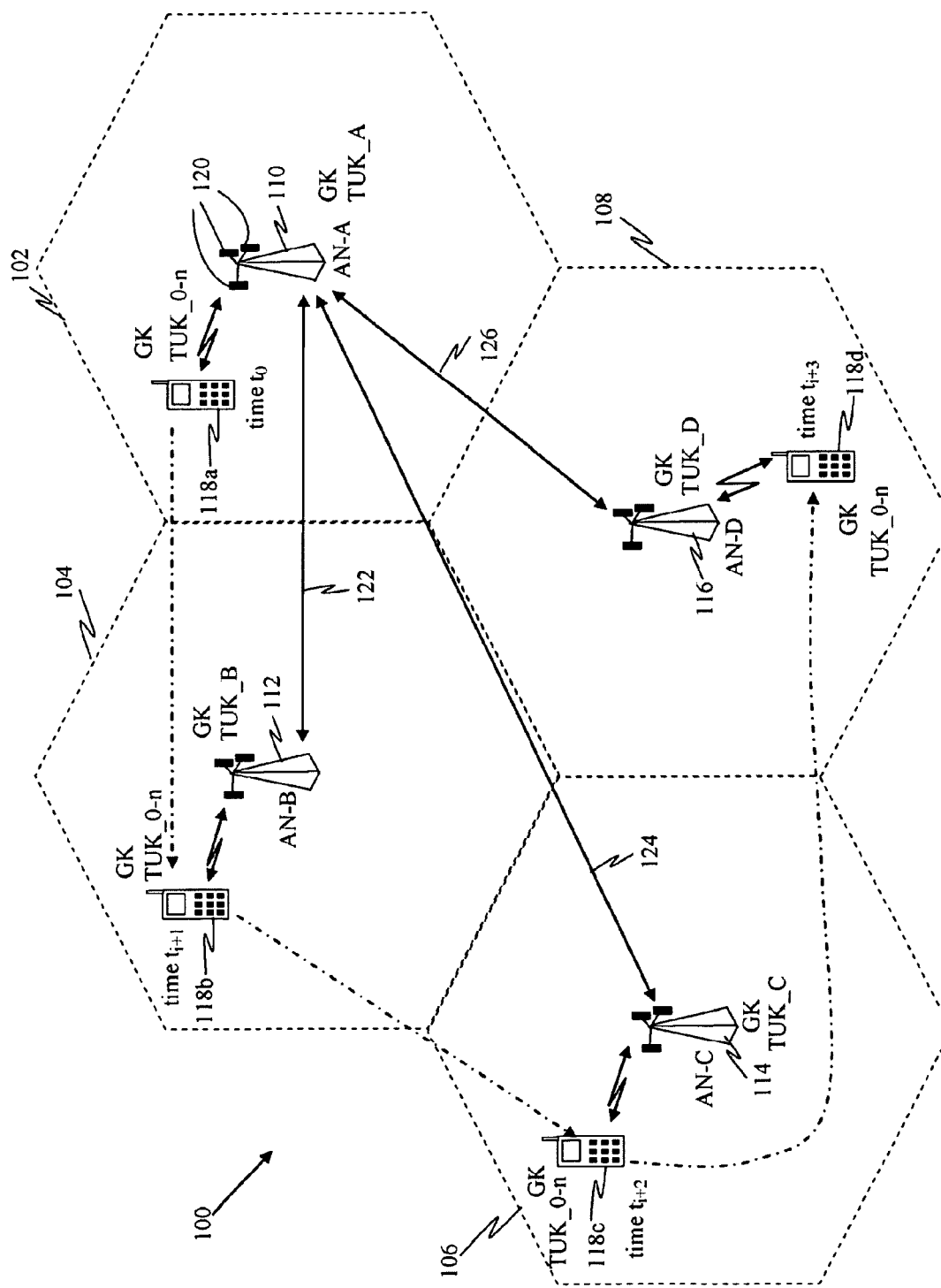
FIG. 1 illustrates a wireless communication system in which group key distribution and/or management may be implemented for multi-cast message security.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

In wireless communications, an access network may be used to connect any number of access terminals to a wide area network (WAN), such as the Internet or a Public Switched Telephone Network (PSTN). The access network is typically implemented with multiple fixed-site access nodes dispersed throughout a geographic region. The geographic region is generally divided into cells. Each access node is configured to provide a point of access to a WAN for access terminals in a cell. The term "access network" may refer to a collection of access nodes (AN) with which one or more access terminals (e.g., wired or wireless) may communicate. The access network may transport data packets between multiple access terminals (AT). The access network may be further communicatively coupled to additional networks outside the access network, such as a corporate intranet or the Internet, and may transport data packets between each access terminal and such outside networks.

The transmission techniques described herein may also be used for various wireless communication systems such as a code division multiple access (CDMA) system, a time division multiple access (TDMA) system, a frequency division multiple access (FDMA) system, an orthogonal frequency division multiple access (OFDMA) system, a single carrier FDMA (SC-FDMA) system, and so on. An OFDMA system utilizes orthogonal frequency division multiplexing (OFDM), which is a modulation technique that partitions the overall system bandwidth into multiple (K) orthogonal subcarriers. These subcarriers (SC) are also called tones, bins, and so on. With OFDM, each subcarrier may be independently modulated with data. A SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

As used herein, an access node may be a fixed station used for communicating with an access terminal and may also be referred to as, and include some or all the functionality of, a base station, a Node B, or some other terminology. An access terminal may also be referred to as, and include some or all the functionality of, a user equipment (UE), a wireless communication device, terminal, mobile terminal, a mobile station, a mobile phone, or some other terminology. The terms "broadcast" and "multi-cast" may be interchangeably used to refer to a one-to-many transmission. Meanwhile, the term "unicast" may refer to a targeted transmission intended for a particular recipient, even if such transmission passes through intermediary relays.

One feature provides a system and method for generating, distributing, and managing a group key between an access terminal (e.g., mobile terminal, wireless user terminal, etc.) and one or more access nodes (e.g., base stations, etc.) in an active set associated with the access terminal. In particular, a method is provided for an access terminal to securely deliver the group key to the one or more access nodes. The group key may be generated and distributed by the access terminal to the access nodes in its active set. A new group key may be generated and distributed every time an access node is removed from the active set of trusted access nodes associated with the access terminal.

To distribute the group key to each access node, a unique, temporary unicast key may be established between the access terminal and an access node in the active set. This may be done, for example, when the access node is added to the active set for the access terminal. The access terminal encrypts a new group key using each of the unique temporary unicast keys associated with each of the access nodes in the active set. Once encrypted, the access terminal sends or unicasts each individual encrypted message containing the new group key to the access node for which it is encrypted. Each access node decrypts its message using its own unique temporary unicast key to obtain the new group key.

Subsequently, the access terminal may encrypt a new message using the group key and broadcast the message so that one or more of the access nodes in its active set can decrypt it using the previously distributed group key. Since the message encrypted by the group key may be broadcasted or multicasted just once by the access terminal, multiple copies or versions of the same message, encrypted with different keys, are not necessary. The message encrypted with the group key may be a broadcast or multi-cast message that is intended for access nodes in the active set. By sending a multi-cast message, air resources are saved as the message may be sent just once. In one example, such a multi-cast message may include an update of the status of the access terminal to all access nodes in its active set. This provides more efficient feedback from the access terminal to the access nodes than in the prior art approach where the access terminal would communicate with just one of the access nodes at any given time. Consequently, this may allow the access nodes to operate more autonomously.

In yet another feature, the group key may be utilized between access nodes of an active set to facilitate authentication between said access nodes. This may allow access nodes to authenticate each other prior to sending information or messages there between. For example a first access node may be selected as the serving access node at any given time by the access terminal. The serving access node may request a data tunnel with a second access node that operates as an anchor node, through which communications for the access terminal are sent by other networks. In order to deliver data to the access terminal, the anchor node first authenticates the serving access node using the group key (e.g., it authenticates that the requesting node is a valid member of the active set for the access terminal). If the requesting/serving access node is successfully authenticated, the data tunnel is established between the anchor node and serving access node through which communication to and/or from the access terminal can occur. In this manner, the group key may be used to facilitate tunneling for forwarding communications for the access terminal between access nodes.

FIG. 1 illustrates a wireless communication system 100 in which group key distribution and/or management may be implemented for multi-cast message security. The wireless communication system 100 may include multiple cells, e.g. cells 102, 104, 106, and 108. Each cell 102, 104, 106, and 108 may include an access node (e.g., one or more base stations) 110, 112, 114 and 116 that provides coverage to multiple sectors within the cell. The access nodes 110, 112, 114 and 116 within each cell 102, 104, 106, and 108 may provide network connection services to one or more access terminals. Each access node 110, 112, 114 and 116 may include one or more antennas 120 that provide network coverage to mobile terminals (e.g., user terminals) across multiple sectors in a cell. For example, in cell 102 the access node 110 includes a group of antennas 120 where each antenna provides network coverage to a different sector within the cell 102. Similarly, in cells 104, 106 and 108 the access nodes 112, 114 and 116 may include groups of antennas, where each antenna provides network coverage to a different sector within a cell. As used herein, transmissions from an access node to an access terminal may be referred to as forward link or downlink and transmissions from the access terminal to the access node may be referred to as reverse link or uplink.

According to one feature, one of the access nodes in the active set may operate or function as an anchor node for an access terminal 118, i.e. an interface (e.g. gateway) that is responsible for facilitating communications with other networks and forwarding communications to the access terminal 118 either directly or via other access nodes. The anchor node may provide a common interface point through which other networks can communicate with the access terminal 118 as the access terminal 118 may roam or move through different cells (e.g., different radio coverage areas) that may be served by different access nodes. Consequently, the anchor node may perform some of the functions (e.g., call session forwarding, data routing, etc.) performed by a network controller in prior art communication systems.

In the example of FIG. 1, an access node A (AN-A) 110 may serve as the anchor node to manage the traffic or communications to/from the access terminal 118. The traffic or communications to the access terminal 118 passes through the anchor node 110 which forwards the traffic/communication to a currently serving access node. The serving access node is a node in the active set that functions as the wireless gateway for the access terminal 118 to/from other networks. The serving access node delivers traffic or communications to/from the access terminal through the anchor node 110. The serving access node may also forward encrypted multi-cast messages from the access terminal to each access node in the active set of the access terminal 118. The serving access node may merely forward an encrypted message without prior decryption of the message. Any access node in the active set, at any given time, may be selected as the serving access node. In this example, access node B (AN-B) 112 may be closest to the access terminal 118 at a particular time $t_{i+1}$ and is selected as the serving access node. Once selected, the serving access node 112 may then request to establish a data tunnel 122 with the anchor node 110 such that it may deliver data/communications to the access terminal 118. The anchor node 110 may verify that the access node requesting to serve as the serving access node is a currently valid member of the active set for the access terminal 118. Similarly, at a time $t_{i+2}$, when the access terminal 118 may move or roam into cell 106, access node C 114 may become the serving access node for access terminal 118 by establishing a communication data tunnel 124 with the anchor node 110. At a later time $t_{i+3}$, when the access terminal 118 may move or roam into cell 108, access node D 116 may become the serving access node for access terminal 118 by establishing a communication data tunnel 126 with the anchor node 110. Consequently, the anchor node A 110 is the gateway through which incoming communications to the access terminal 118 may be forwarded to a current serving access node and outgoing communications from the access terminal 118 may pass to other networks.

As the access terminal 118 moves or roams between different cells or sectors, a local access node may request to become the serving access node. Each access node 110, 112, 114 and 116 may have its own unique temporary unicast key (TUK) for associating with the access terminal 118. A TUK may be generated by either the access node and/or access terminal and is maintained between the access node and the access terminal. For example, at time to the access terminal 118a may initially secure communications with access node A (AN-A) 110 using a secured temporary unicast key A (TUK_A) that is uniquely associated with the communication link between the access terminal 118 and the access node 110. The key TUK_A may be negotiated between the access terminal 118 and access node A 110, for example, when the access node A 110 is first added to the active set. At a later time $t_{i+1}$, as the access terminal 118b moves or roams to a different sector or cell 104, its wireless communication service (e.g., communication session) may be handed off to access node B (AN-B) 112. The access terminal 118b may secure communications with access node B (AN-B) 112 using a secured temporary unicast key B (TUK_B) that is uniquely associated with the communication link between the access terminal 118 and access node B 112. Similarly, at time $t_{i+2}$ as the access terminal 118c moves into cell 106, the access terminal 118c may secure communications with access node C (AN-C) 114 using a secured temporary unicast key C (TUK_C) that is uniquely associated with the communication link between access terminal 118 and the access node C 114. At a later time $t_{i+3}$, the access terminal 118d may secure communications with access node D (AN-D) 116 using a secured temporary unicast key D (TUK_D) that is uniquely associated with the communication link between the access terminal 118 and access node D (AN-D) 116.

To distribute a group key GK to the access nodes in its active set, the access terminal 118 may utilize the unique TUKs for each access node to encrypt a message containing the group key GK which is then sent or unicast to the access node associated with a particular TUK. That is, the access terminal sends or unicasts each individual encrypted message containing the new group key to the access node for which it is encrypted. For example, access terminal 118 may utilize a TUK_A to securely encrypt and send the group key GK to access node A 110. Likewise, the access terminal 118 may use TUK_B, TUK_C, and TUK_D to encrypt and send the group key GK to access nodes B 112, C 114, and D 116, respectively, either directly or via another access node. As a result, each access node receives the same group key GK but may utilize a different TUK to decrypt the group key GK.

Once a group key GK has been distributed, the access terminal 118 may then send, broadcast, and/or multi-cast a message (e.g., status information, etc.) to access nodes that are in the access terminal's active set (e.g., access nodes A 110, B 112, C 114, and/or D 116). In some instances, an access node that is too far away from the access terminal 118 to receive a wireless broadcast may receive it via a relay from another access node in the active set.

In some examples, the access terminal 118 may be in communication with two or more sectors of one or more cells. This may be done in order to allow communication sessions to be handed off between different sectors or cells as the access terminal 118 moves or travels, for proper capacity management, and/or for other reasons. Consequently, as the access terminal 118 moves across the different cells 102, 104, 106, and 108, it may be in communication with access nodes 110, 112, 114 and 116.

According to yet another feature, the group key GK may be employed between access nodes in the active set associated with the access terminal 118 to authenticate each other. For instance, as an access terminal moves from one cell to another, its serving access node may change from a current serving access node to a new serving access node. In order for the anchor access node to start forwarding communications to the new access node, it may first authenticate it to verify that it belongs to the active set for the access terminal 118. In one example, as the access terminal 118c moves into cell 106 it may wish to communicate through access node C as its serving access node. A request may be sent to the anchor node 110 to start forwarding communications for the access terminal 118c to the new serving access node 114. The anchor access node 110 may authenticate the new serving access node 114 to verify, for example, that it belongs to the active set for the access terminal. Such authentication may involve verifying that the new serving access node 114 also knows the group key GK for the active set.

Figure 2:
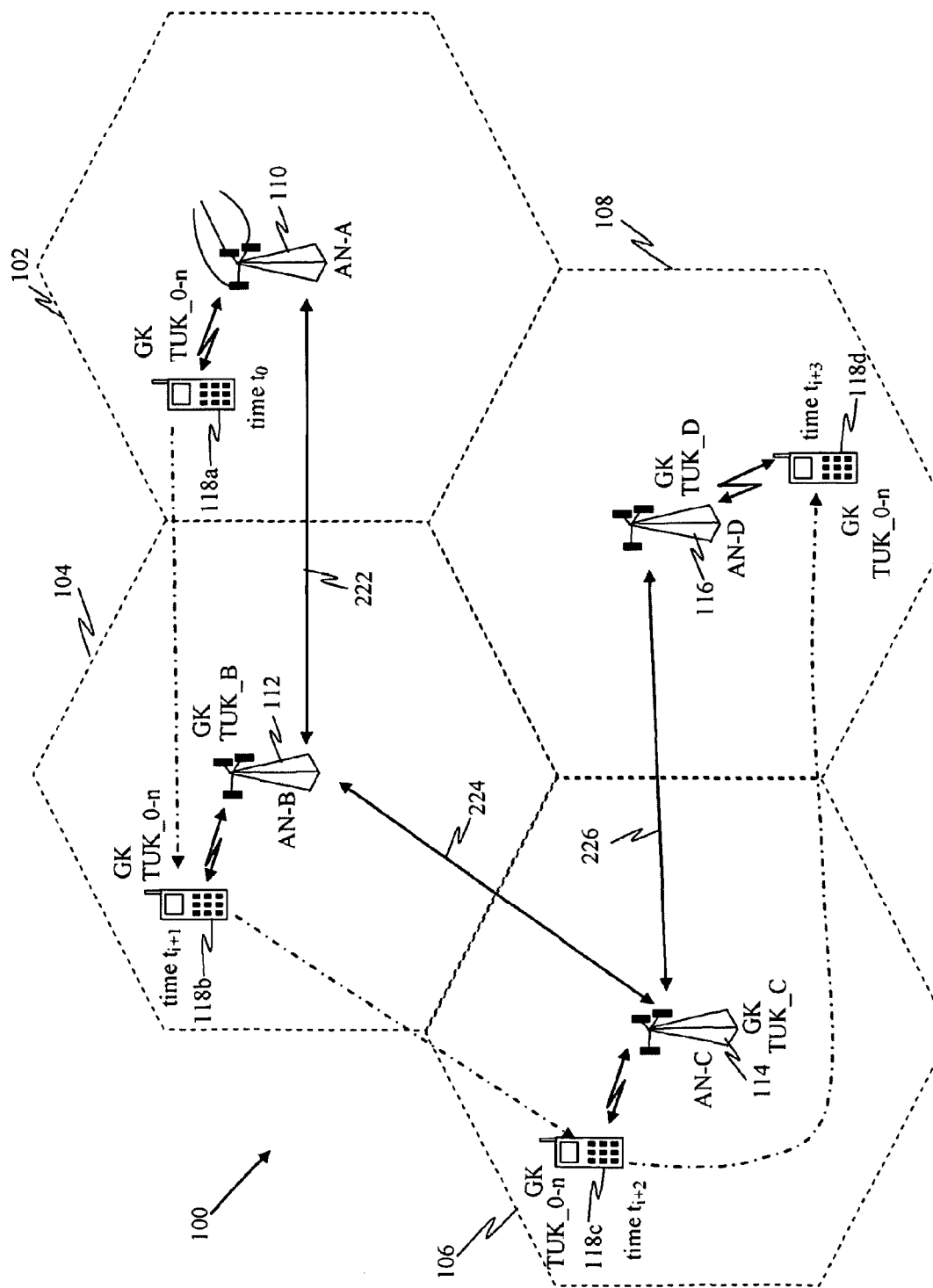
FIG. 2 illustrates an alternative configuration of the wireless communication system in FIG. 1.
Figure 3A:
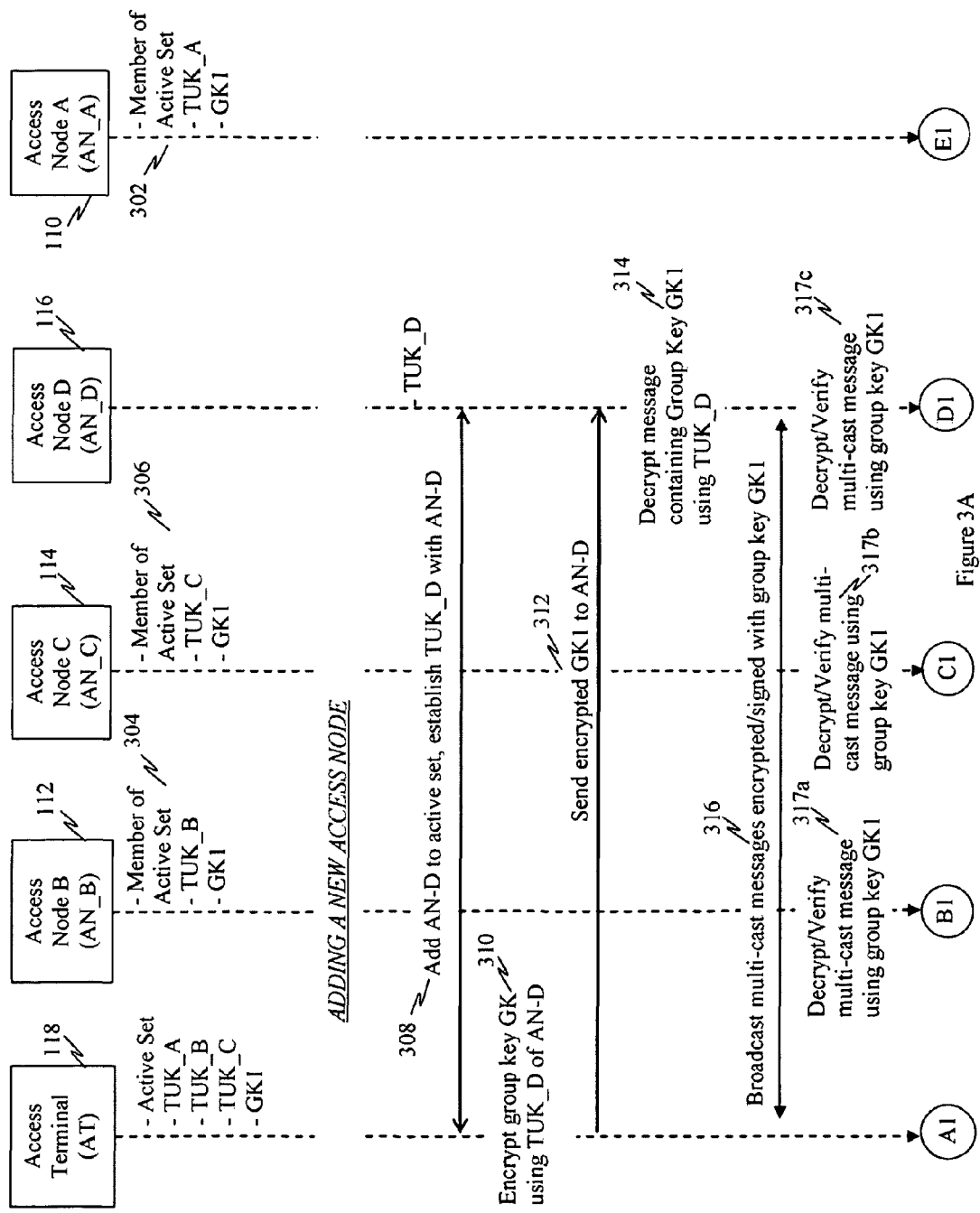
FIG. 3 (comprising FIGS. 3A, 3B, 3C and 3D) is a flow diagram illustrating one example of the operation of a wireless communication system with group key distribution and management for multi-cast message security.
Figure 3B:
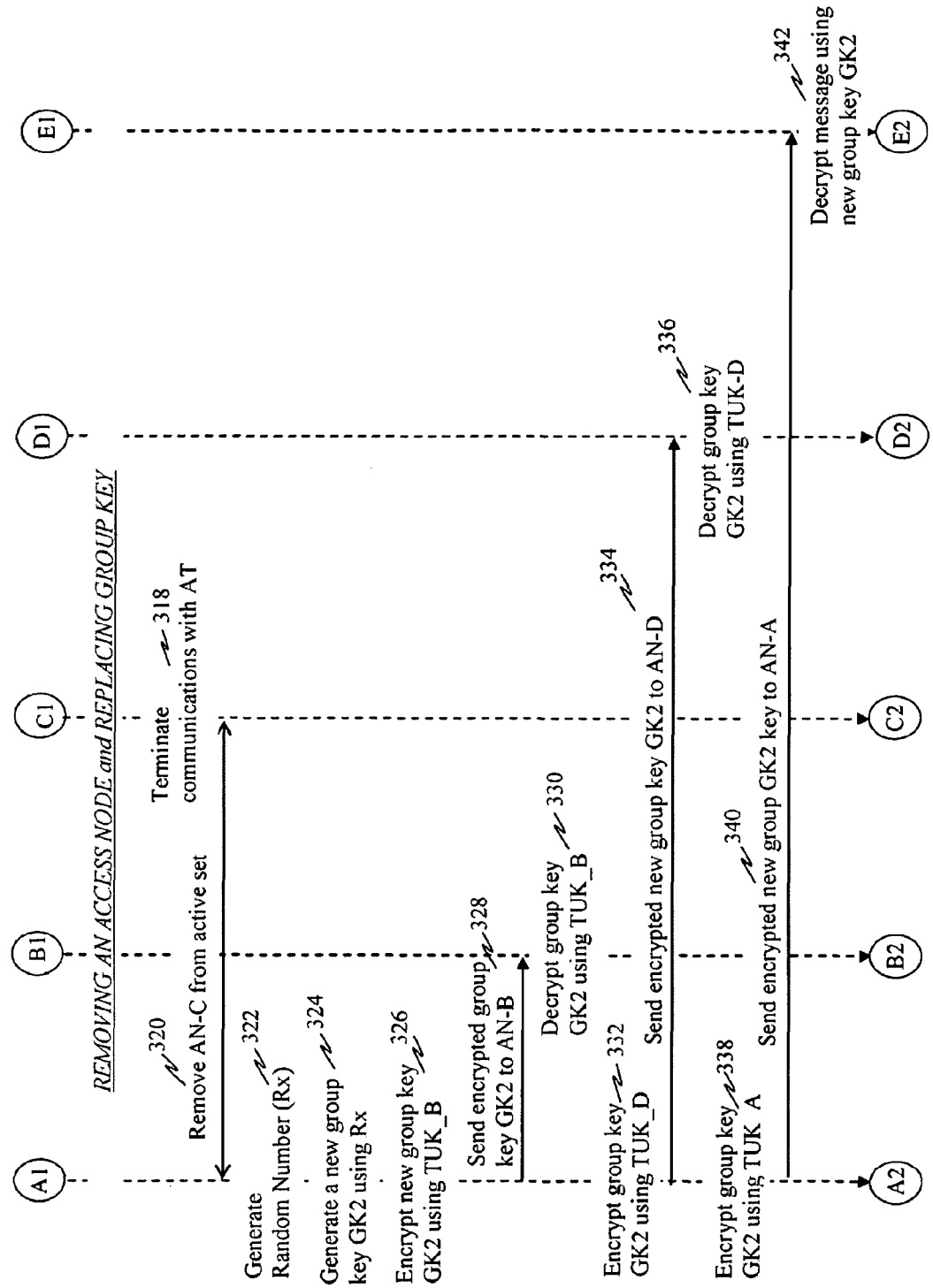
Figure 3C:
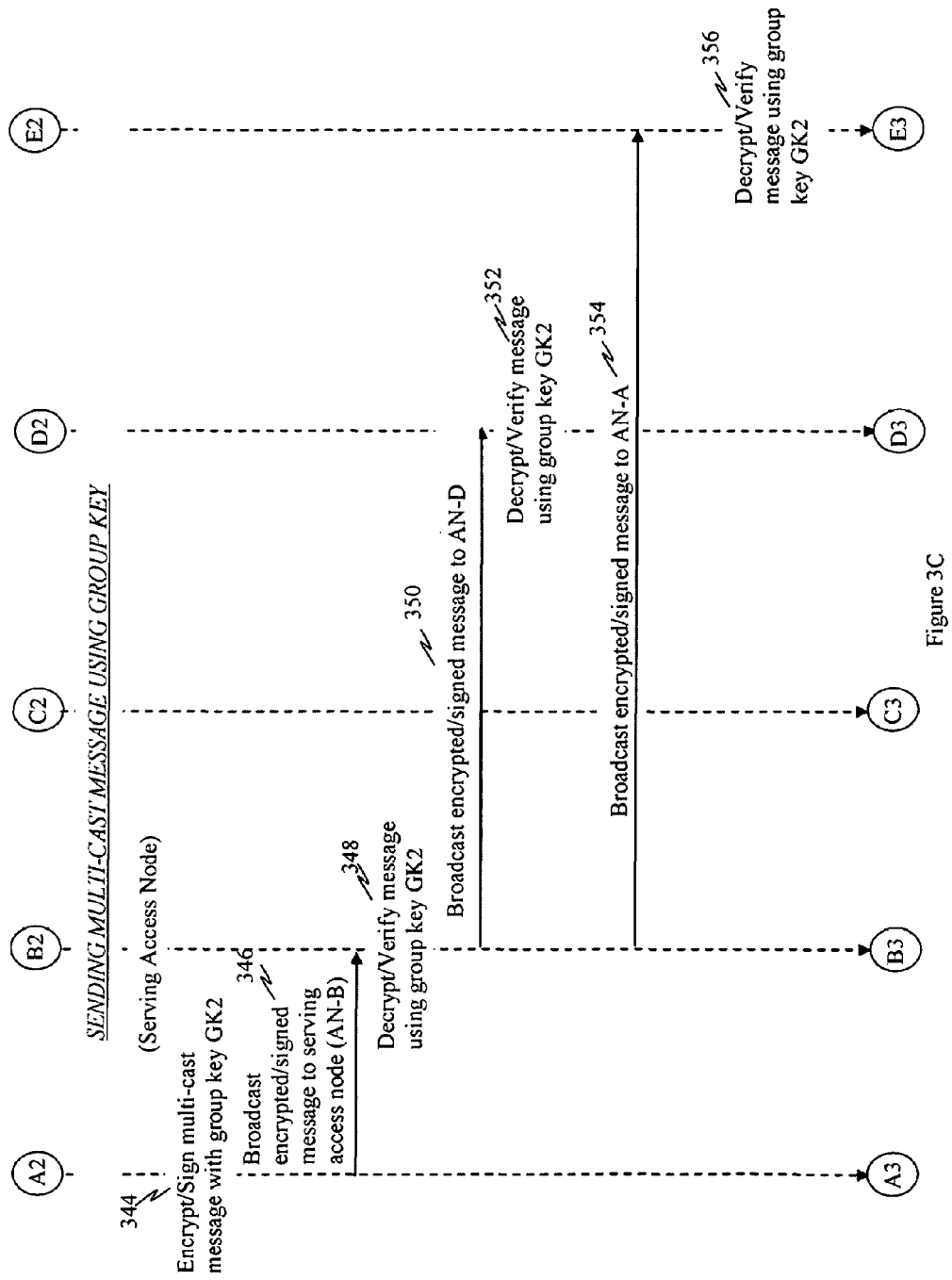
Figure 3D:
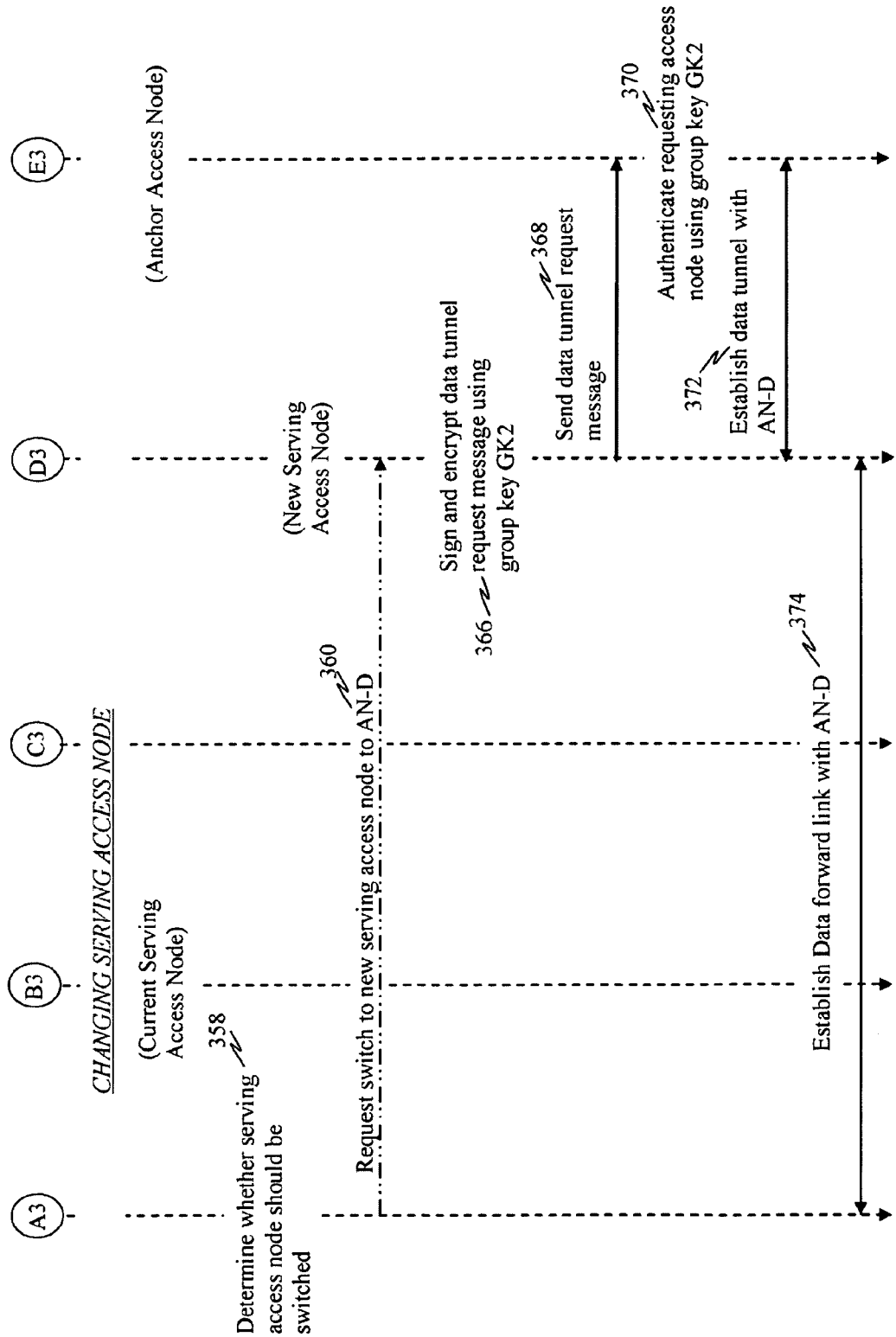

FIG. 2 illustrates an alternative configuration of the wireless communication system 100 in FIG. 1. In this configuration, communications for an access terminal are forwarded to a new serving access node from a previous serving access node rather than a centralized anchor access node as in FIG. 1. In this example, a forwarding feature is illustrated in which communications may be forwarded between multiple access nodes. As the access terminal 118 roams or moves between different cells, it may change its serving access node. Rather than establishing a direct communication link between the anchor node 110 and a current serving access node (as illustrated in FIG. 1), a current serving access node may receive its communications via a previous serving access node. For example, at a particular time $t_{i+1}$, access node B 112 may be the serving access node for access terminal 118b and has a communication data tunnel 222 with the anchor access node A 110. At time $t_{i+2}$, the access terminal 118c may move into cell 106 and seek to make access node C 114 its serving access node. Therefore, a communication data tunnel 224 is established with access node B 112. Similarly, at time $t_{i+3}$, the access terminal 118c may move into cell 108 and seek to make access node D 116 its serving access node. Therefore, a communication data tunnel 226 is established with access node C 114. At each stage, a previous serving access node may authenticate a new serving access node (e.g., by using the group key GK) prior to establishing a communication data tunnel.

In various examples, the wireless communication systems 100 (of FIGS. 1 and 2) may be implemented in 2G and 3G networks, including for example, ultra mobile broadband (UMB) networks, universal mobile telecommunications systems (UMTS), Wideband CDMA networks, among others.

FIG. 3 (comprising FIGS. 3A, 3B, 3C and 3D) is a flow diagram illustrating one example of the operation of a wireless communication system with group key distribution and management for multi-cast message security. In this example, the access terminal 118, access node A (AN-A) 110, access node B (AN-B) 112, access node C (AN-C) 114, and access node D (AN-D) 116 of FIG. 1 are used for illustration purposes.

According to a first feature, an access terminal may add a new access node to its active set of access nodes and securely distribute the group key to the new access node. Initially, access nodes 110, 112, and 114 may be in the active set and each access node may have established a unique temporary unicast key (TUK), for example TUK_A, TUK_B, and TUK_C, 302, 304 and 306, respectively, with the access terminal 118. Each member of the active set may have a first group key GK1. In one example, the access terminal 118 may add another access node, such as access node D (AN-D) 116, to its active set. This may occur, for example, when the access terminal comes to within wireless connection range of the new access node D (AN-D) 116. To add the new access node, the access terminal 118 may establish a unique temporary unicast key (TUK_D) with access node D (AN-D) 308. Using the unique temporary unicast key TUK_D associated with access node D (AN-D), the access terminal 118 may encrypt the first group key GK1 in a message 310 and transmits the message with the encrypted first group key GK1 to access node D 312. Access node D 116 may then decrypt the message using its unique temporary unicast key (TUK_D) to obtain the first group key GK1 314. The access terminal 118 may then broadcast multi-cast messages encrypted or signed with the first group key GK1 316 which can be decrypted/verified by access nodes in the active set using the first group key GK1 317. That is, where secure message transmission is desired, a multi-cast message may be encrypted using the first group key GK1 by the access terminal 118 and decrypted (upon reception) by the access nodes using the same group key GK1. Alternatively, where mere authentication/verification is desired (e.g., for non-private information), the access terminal 118 may sign the multi-cast message using the group key GK1 and it can be verified by receiving access nodes using the same group key GK1.

In some instances, the access terminal 118 may not be able to communicate directly with one or more access nodes in its active set. For instance, access node A (AN-A) 110 may be too far from the access terminal 118 to receive the broadcast 316. In those instances, the access terminal 118 may send the multi-cast message indirectly to access node A 110 via another access node which may then forward the message to the intended recipient access node A 110. As the message is encrypted with the group key GK1, the message content is secure.

According to a second feature, an access terminal may remove an access node from its active set of access nodes and securely replace the group key. In one example, the access terminal 118 may remove an access node, such as access node C (AN-C) 114, from its active set. To remove access node C (AN-C) 114, communication between access node C (AN-C) 114 and the access terminal 118 may be terminated 318. The access terminal 118 may then remove access node C (AN-C) 114 from its active set 320. However, to prevent the removed access node C 114 from decrypting subsequent multi-cast messages (encrypted with the first group key GK1), a new group key GK2 is generated 324 and distributed. Once access node C 114 has been removed from the active set, the access terminal 118 may generate a random number (Rx) 322 which it may use to generate the new group key GK2 324. Once the new group key GK2 has been generated, the access terminal 118 may then distribute the new group key GK2 to all access nodes in its active set, in this case, AN-A 110, AN-B 112, and AN-D 116.

To send the new group key GK2 to AN-B 112, the access terminal 118 may encrypt the new group key GK2 using the unique temporary unicast key TUK_B 326, and then transmit the encrypted new group key GK2 to access node B (AN-B) 328. By encrypting the new group key GK2 prior to distribution, this prevents potential eavesdroppers from obtaining the group key GK2. Access node AN-B 112 may then decrypt the encrypted group key GK2 using TUK-B 330 to obtain the new group key GK2 so that it may decrypt subsequent multi-cast message broadcasts by the access terminal 118. The access terminal 118 may similarly encrypt the new group key GK2 with the unique temporary unicast key TUK_D 332 for access node D 116, and then may transmit the encrypted group key GK2 to access node D (AN-D) 334. Access node AN-D 116 may then decrypt the encrypted group key GK2 using TUK_D 336 to obtain the new group key GK2 so that it may decrypt subsequent multi-cast messages broadcast by the access terminal 118. The access terminal 118 may then encrypt the group key GK2 with the unique temporary unicast key TUK_A 338, and transmit the encrypted group key GK2 to access node A (AN-A) 340. Access node A (AN-A) 110 may then decrypt the encrypted group key GK2 using TUK_A to obtain the new group key GK2 so that it may decrypt subsequent multi-cast message broadcast by the access terminal 342. Communications may then be securely established between AN-A 110, AN-B 112, and AN-D 116 and the access terminal 118 using the new group key GK2. This process may be repeated until all access nodes in the active set for the access terminal 118 have received the new group key GK2.

According to a third feature, an access terminal may send a multi-cast message using a group key. In one example, the access terminal 118 may broadcast a multi-cast message to all members of its active set. In this example, it is assumed that access node AN-B 112 is the currently serving access node for the access terminal 118. The multi-cast message may be either encrypted or signed using the new group key GK2 depending on whether security or mere verification is desired. The access terminal 118 may encrypt or digitally sign the multi-cast message with the group key GK2 344 and broadcast the multi-cast message to the serving access node 346, e.g., access node B (AN-B) 112 in this example. Where secure message transmission is desired, a multi-cast message may be encrypted using the group key GK2 by the access terminal 118 and decrypted (upon reception) by the access nodes using the same group key GK2. Alternatively, where mere authentication/verification is desired (e.g., for non-private information), the access terminal 118 may sign the multi-cast message using the group key GK2 and it can be verified by receiving access nodes using the same group key GK1.

Upon reception, the serving access node, AN-B 112, may decrypt/verify/authenticate the message using the group key GK2 348. The serving access node (AN-B) may also forward or rebroadcast the multi-cast message to other access nodes (e.g., via a backhaul network/channel or a wireless network). For instance, the serving access node (AN-B) may forward the encrypted/signed message to access node D (AN-D) 350 and access node A (AN-A) 354 where the message is decrypted/verified 352 and 356 using the group key GK2.

According to a fourth feature, an access terminal may change its current serving access node to a new serving access node. In one example where access node B (AN-B) is the current serving access node and access node A is the anchor access node, the access terminal 118 may continue to listen for broadcasts (e.g., pings or beacons) from local access nodes to determine whether a handoff or switch should occur from its current serving access node to a new serving access node 358, such as from access node B 112 (AN-B) to access node D (AN-D) 116. That is, as the access terminal 118 roams or moves into a different sector or cell, or a stronger signal may be detected from another access node, either currently in its active set or not in its active set. In some examples, the access terminal 118 may select a new serving access node from its active set. The decision of whether to switch from a current serving access node to a new serving access node may be based on the signal strength from each access node (e.g., the access node with the strongest signal is selected as the serving access node). If a switch or handoff to a new serving access node is decided by the access terminal 118, a request may be sent 360. The process of changing over to the new serving access node may be performed in various ways. For example, the access terminal 118 may send a message to either the current serving access node 112 (AN-B) or the anchor access node 110 (AN-A) indicating a switch to the new serving access node 116 (AN-D). Alternatively, the access terminal 118 may send a message directly to the new serving access node 116 (AN-D) on a control channel or indirectly via the current serving access node 112 AN-B.

The new serving access node (AN-D 116) may sign/encrypt a data tunnel request message 366 (e.g., using group key GK2) which may be sent to the anchor access node (AN-A 110) 368. The anchor access node 110 (AN-A) may then authenticate the requesting message and/or the requesting access node (AN-D) using the group key GK2 370. For instance, the anchor access node (AN-A) 110 may verify that the requesting access node (AN-D) 116 is a legitimate member of the active set by using the group key GK2 (known to members of the active set). Once the message has been authenticated, the anchor node (AN-A) 110 may establish a data tunnel with new serving access node D (AN-D) 372. A data forward-link may also be established between the new serving access node (AN-D) 110 and the access terminal 374.

The process of securely switching serving access nodes from one access node to another may be repeated multiple times. In one example, this may be performed in the middle of a communication session (e.g., the communication session link is handed off from a first serving access node to a second serving access node). For example, in FIG. 1, the access terminal 118 may roam or move from a current cell 104 to a new cell 106 and seek to handoff a communication session from a current serving access node (AN-B) 112 to yet another access node. The access terminal 118 may communicate with the new serving access node utilizing the group key, if the new access node is in the access terminal's active set.

An advantage of providing all members of an active set with a group key is that the access terminal may send a single copy of a message encrypted by the group key and only members of the group, or active set, can decrypt it and understand it. This is because each member of the active set may have the group key used to encrypt the message.

Figure 4:
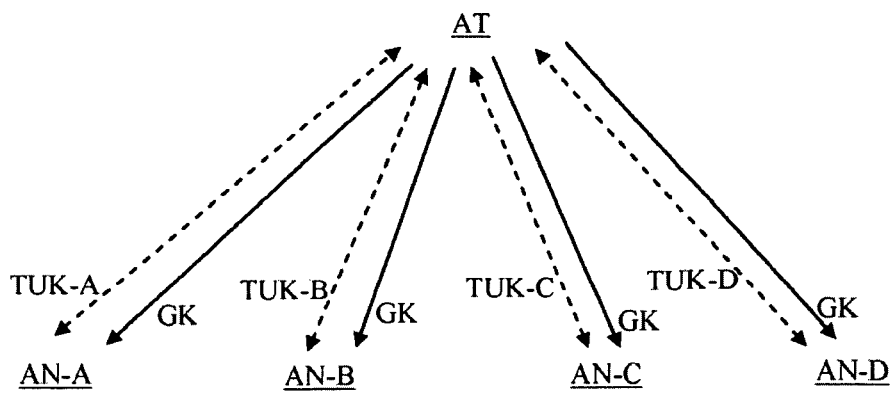
FIG. 4 illustrates a group key distribution scheme that may be used for authenticating a multi-cast message and verifying that the requesting access node is currently a valid member of the active set.

FIG. 4 illustrates a group key distribution scheme that may be used for authenticating a multi-cast message and verifying that the requesting access node is currently a valid member of the active set. In this distribution scheme, a temporary unicast key TUK may be negotiated between an access terminal AT and an access node when the access node AN is added to the active set. The access terminal AT may generate, administer and/or distribute group keys to each access node AN in its active set. A group key (GK) may be provided to an access node (AN) by an access terminal (AT) when the access node joins the active set. During distribution from the access terminal AT to an access node AN, the group key GK may be encrypted by the access node's unique temporary unicast key (TUK) before transmission from the access terminal AT to the access node AN. Because each member of the active set has the same group key GK, the receiving access nodes may decrypt and/or authenticate a multi-cast message. Moreover, because each access node decrypts a new group key using its own TUK, access nodes may be easily added or removed from the active set and still allow multi-cast messages to be authenticated and requesting access nodes verified. For example, a first access node may verify that a second access node is a member of the active set for an access terminal, the first access node may receive a message (from the second access node) encrypted/signed with the group key for the active set. If the received message can be decrypted/authenticated by the first, then the sending access node is in the active set.

In a prior art approach, a mobile wireless communication system has multiple access nodes that provide service to an access terminal. When there is a communication handoff between the access nodes, the access terminal maintains unique security keys to each access node with which it communicates. However, this architecture creates serious security risks when the access terminal sends broadcast or multicast messages. For example, where the access terminal needs to securely send a multi-cast message, such as an air-interface message, to all access nodes in the active set through the serving access node, an attacker may forge a multi-cast message and send the forged message to an access node. In the prior art architecture, the access node is unable to verify the identity of the sender, creating a security risk.

Furthermore, an access node in an active set at any given time may be selected as the serving access node and request to establish a data tunnel with the anchor node so that it can deliver data to the access terminal. However, in the prior art architecture, the requesting access node may not be a currently valid member of the active set, thereby creating a potential security risk.

As used in FIGS. 1-4 and the description herein, the temporary unicast keys (TUK) may also be referred to as temporary keys in that they are specific to a particular access node/access terminal pair and/or they may be used only for a limited amount of time after a communication session is handed off. In some implementations, such temporary keys may also be used for a prolong period of time until the communication session is handed off to another access node or the communication session ends.

Figure 5:
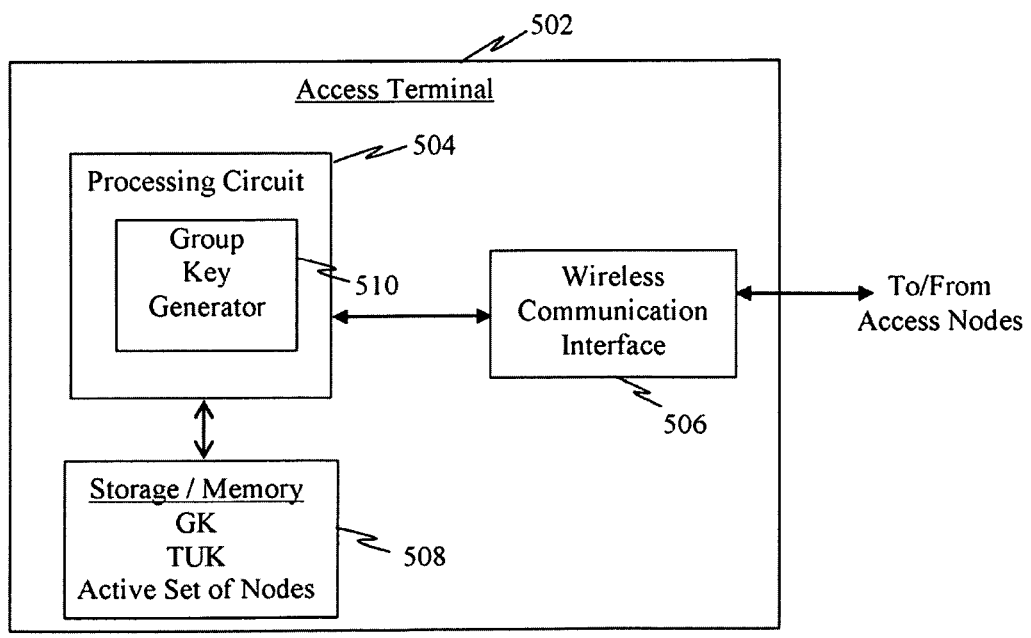
FIG. 5 is a block diagram illustrating an access terminal configured to perform group key distribution and management for multi-cast message security.

FIG. 5 is a block diagram illustrating an access terminal 502 configured to perform group key distribution and management for multi-cast message security. Various examples of an access terminal include a wireless communication device, mobile terminal, and a mobile phone or cell phone. The access terminal 502 may include a processing circuit 504 coupled to a wireless communication interface 506 to communicate with access nodes, and a storage device 508 to store the group key GK and unique temporary unicast keys TUKs associated with the access nodes. The processing circuit 504 (e.g., processor, processing module, etc.) may include a group key generator module 510 configured to generate one or more group keys that can be used to secure a communication session. The processing circuit 504 may be configured to listen for and add access nodes to its active set. The processing circuit 504 may manage the group key GK so that it is securely distributed to access nodes in the active set by using the unique temporary unicast key for each access node. The processing circuit 504 may also be configured to replace the group key GK with a new group key when an access node is removed from the active set. The group key GK may be used to encrypt a multi-cast message intended for the access nodes in its active set.

Figure 6:
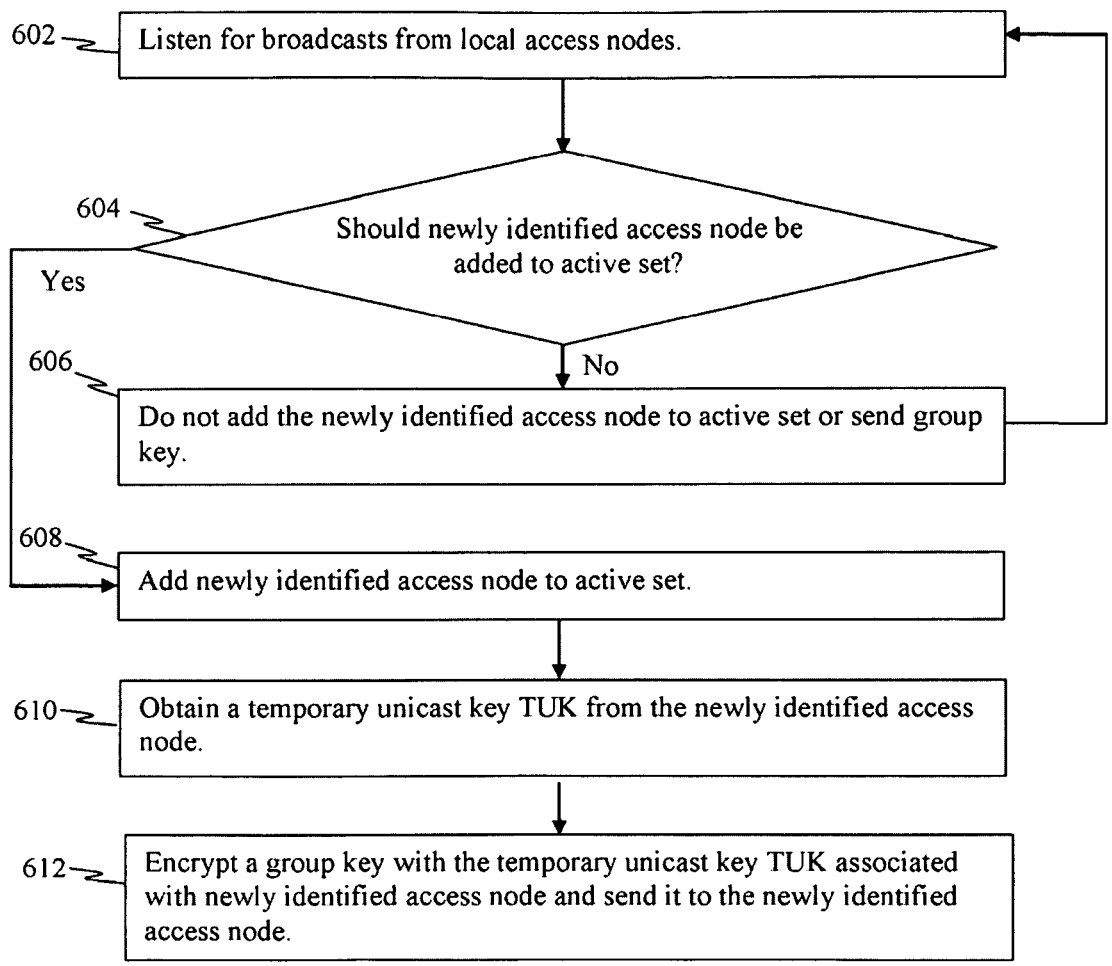
FIG. 6 is a flow diagram illustrating a method operational in an access terminal to add an access node to an active set of access nodes.

FIG. 6 is a flow diagram illustrating a method operational in an access terminal to add an access node to an active set of access nodes. Initially, the access terminal may listen for broadcasts from local access nodes 602. If an access node is identified that is not currently in the active set, the access terminal may determine whether the access node should be added to its active set 604. This may be determined, for example, by the strength of a pilot signal received from the access nodes where stronger pilot signals are preferred since it is assumed that corresponding access nodes are closer to the access terminal. If a newly identified access node has a weak pilot signal, it is not added to the active set and the group key is not sent to that access node 606. Otherwise, the access terminal may choose to add the newly identified access node to its active set 608. The access terminal may obtain a temporary unicast key TUK from the newly identified access node 610. The access terminal may then encrypt the group key in a message using the temporary unicast key TUK of the newly identified access node and send it the newly identified access node 612.

Figure 7:
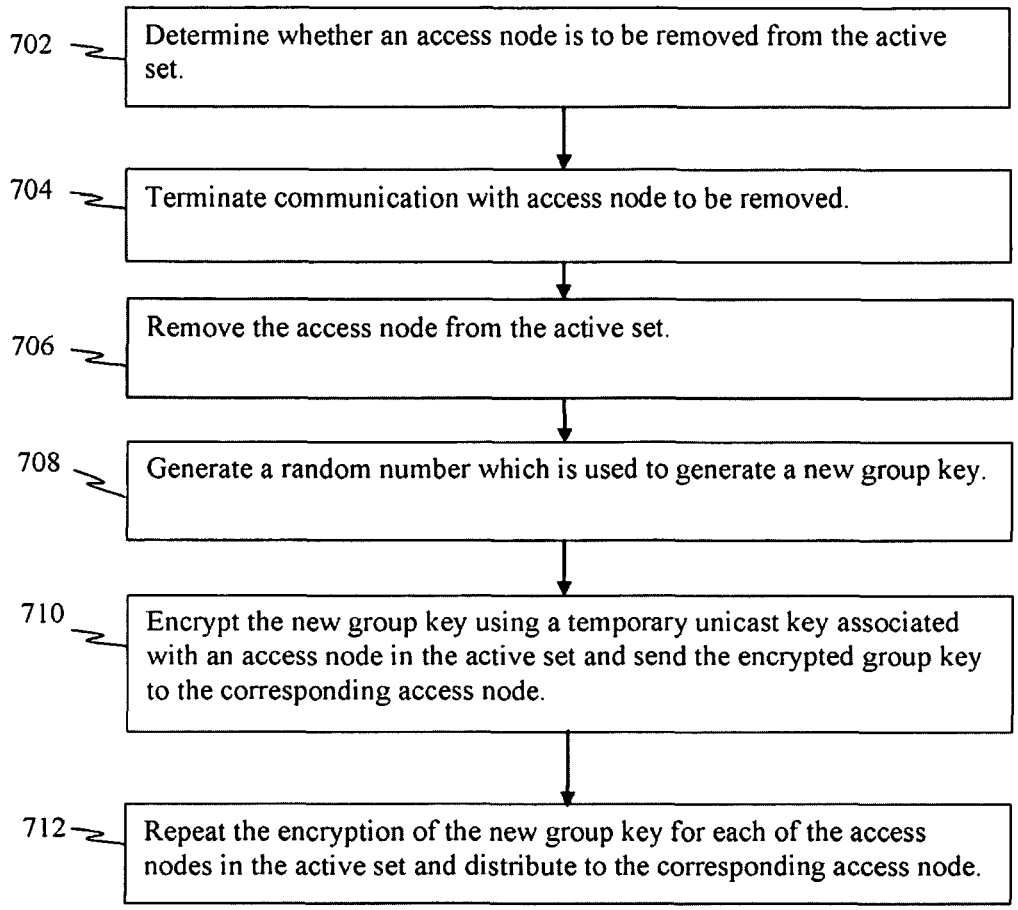
FIG. 7 is a flow diagram illustrating a method operational in an access terminal to remove an access node from an active set of access nodes and replace the group key.

FIG. 7 is a flow diagram illustrating a method operational in an access terminal to remove an access node from an active set of access nodes and replace the group key. Initially, the access terminal may determine that an access node in the active set is to be removed 702. Communication between the access node to be removed and the access terminal may be terminated 704. The access terminal may then remove the access node from its active set 706. Once the access node has been removed, the access terminal may generate a random number (Rx) which may be used to generate a new group key 708. Once the new group key has been generated, the access terminal may then encrypt it using a temporary unicast key associated with an access node in the active set and send the encrypted group key to the corresponding access node 710. The encryption of the new group key is repeated for each of the access nodes in the active set and each encrypted group key is sent to the corresponding access node 712.

Figure 8:
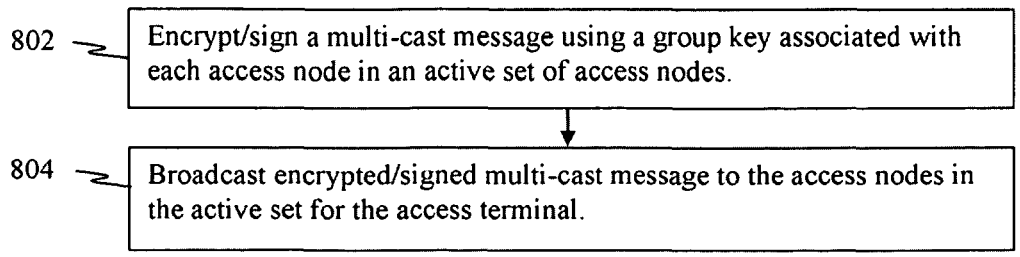
FIG. 8 is a flow diagram illustrating a method operational in an access terminal to broadcast a multi-cast message to an active set of access nodes.

FIG. 8 is a flow diagram illustrating a method operational in an access terminal to broadcast a multi-cast message to an active set of access nodes. Initially, the access terminal may encrypt/sign a multi-cast message using a group key associated with the access terminal 802. That is, the group key may have been previously distributed to the access nodes in the active set. The access terminal may then broadcast the encrypted/signed multi-cast message to the access nodes in the active set for the access terminal 804. In one example, this may be done by sending the encrypted/signed multi-cast message to a currently serving access node for the access terminal. The currently serving access node may then duplicate and forward the encrypted/signed multi-cast message to the other access nodes in the active set.

Figure 9:
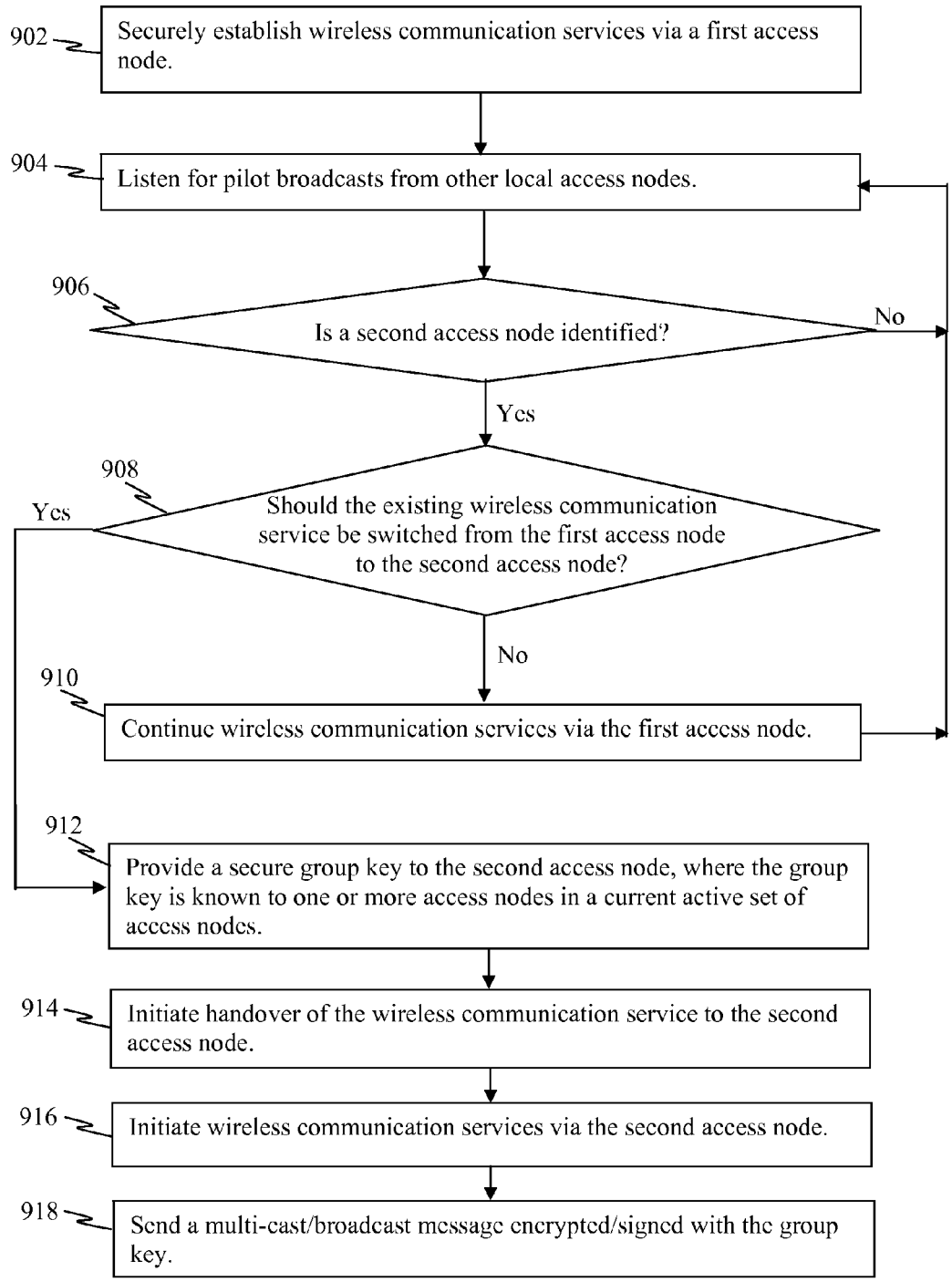
FIG. 9 is a flow diagram illustrating a method operational in an access terminal to change from a first serving access node to a second or new serving access node.

FIG. 9 is a flow diagram illustrating a method operational in an access terminal to change from a first serving access node to a second or new serving access node. The access terminal may securely establish wireless communication services via a first access node 902. The access terminal may then listen for pilot broadcasts from other local access nodes 904. That is, access nodes may send periodic pilot or beacons to notify local terminals of their presence. If no other access node(s) is identified, the access terminal continues to use the first access node for wireless communication services. However, if a second access node is identified 906, the access terminal may determine whether the existing wireless communication service should be changed or switched from the first access node to the second access node 908. This may be determined by comparing the pilot signal strength and/or quality of the first access node with that of the second access node. That is, as the access terminal roams or moves into a different sector or cell, a stronger pilot signal may be detected from other access nodes (e.g., the second access node), resulting in a handover of wireless communication services to a new serving access node. If the pilot signal from the first access node is stronger than other pilot signals, the access terminal may continue its wireless communication services via the first access node 910. Otherwise, a secure group key may be provided to the second access node, where the group key is known to one or more access nodes in a current active set of access nodes 912. The access terminal may then choose to initiate handover of the wireless communication service (e.g., a communication link, an existing communication session, etc.) to the second access node which may then become the new forward-link serving access node 914. The access terminal may then initiate wireless communication services via the second access node 916. A multi-cast/broadcast message encrypted/signed with the group key may then be sent via the second access node 918.

Figure 10:
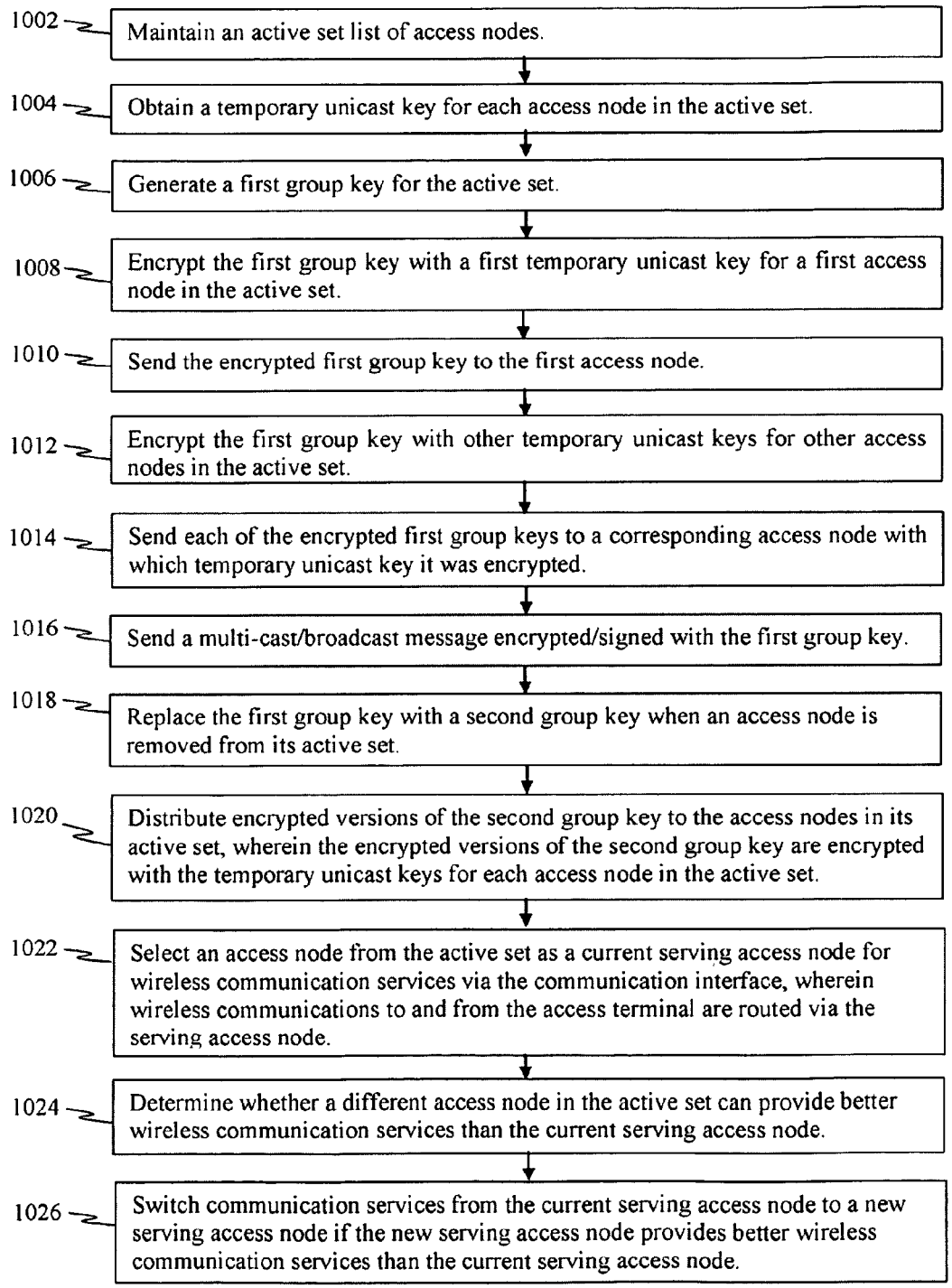
FIG. 10 is a flow diagram illustrating a method operational on an access terminal for facilitating secure multi-cast message distribution from the access terminal to one or more access nodes.

FIG. 10 is a flow diagram illustrating a method operational on an access terminal for facilitating secure multi-cast message distribution from the access terminal to one or more access nodes. The access terminal may maintain an active set list of access nodes 1002, obtain a temporary unicast key for each access node in the active set 1004, and generate a first group key for the active set 1006. The access terminal may then encrypt the first group key with a first temporary unicast key for a first access node in the active set 1008, and send the encrypted first group key to the first access node 1010. Similarly, the access terminal may encrypt the first group key with other temporary unicast keys for other access nodes in the active set 1012, and send each of the encrypted first group keys to a corresponding access node with which temporary unicast key it was encrypted 1014. The access terminal may then send a multi-cast/broadcast message encrypted/signed with the first group key 1016.

The access terminal may also replace the first group key with a second group key when an access node is removed from its active set 1018 and distribute encrypted versions of the second group key to the access nodes in its active set, wherein the encrypted versions of the second group key are encrypted with the temporary unicast keys for each access node in the active set 1020.

The access terminal may also select an access node from the active set as a current serving access node for wireless communication services via the communication interface, wherein wireless communications to and from the access terminal are routed via the serving access node 1022. It may also determine whether a different access node in the active set can provide better wireless communication services than the current serving access node 1024 and may switch communication services from the current serving access node to a new serving access node if the new serving access node provides better wireless communication services than the current serving access node 1026.

Figure 11:
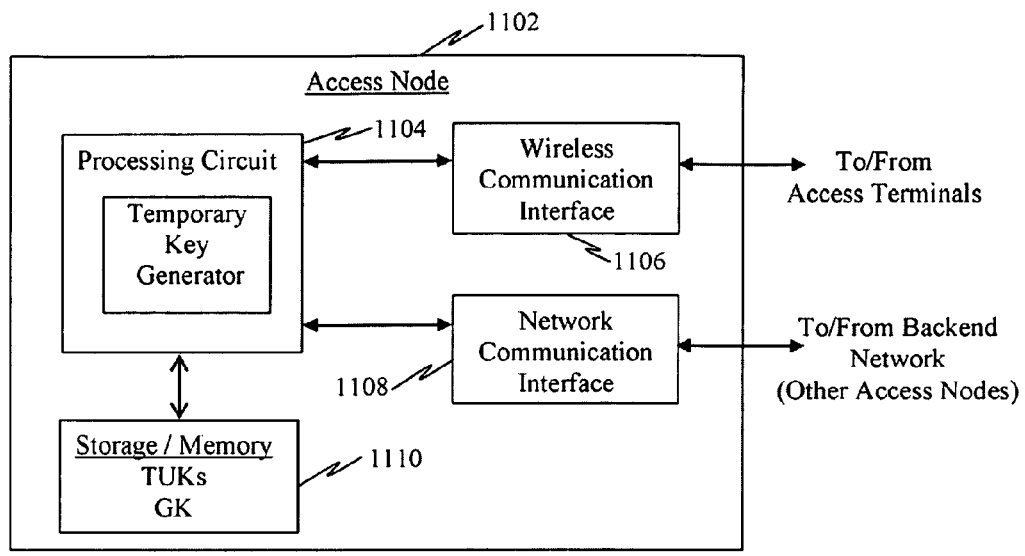
FIG. 11 is a block diagram illustrating an access node configured to facilitate group key distribution and/or management.

FIG. 11 is a block diagram illustrating an access node 1102 configured to facilitate group key distribution and/or management. The access node 1102 may include a processing circuit 1104 coupled to a wireless communication interface 1106 to communicate with one or more access terminals, a network communication interface 1008 to communicate with other access nodes, and a storage device 1110 to store a unique temporary unicast key (TUK) (associated with the access node), and group keys (associated with access terminals). The processing circuit 1104 (e.g., processor, processing module, etc.) may include a temporary key generator module configured to generate one or more temporary unicast keys TUK that can be used to secure a wireless communication link (e.g., wireless communication service) with an access terminal. The processing circuit 1104 may also be configured to use a group key obtained from an access terminal to authenticate itself to another access node associated with the same access terminal. For instance, during a process of becoming a serving access node for a first access terminal, the access node 1102 may use the group key GK1 for the first access node to authenticate itself to an anchor access node or a previous serving access node.

Figure 12:
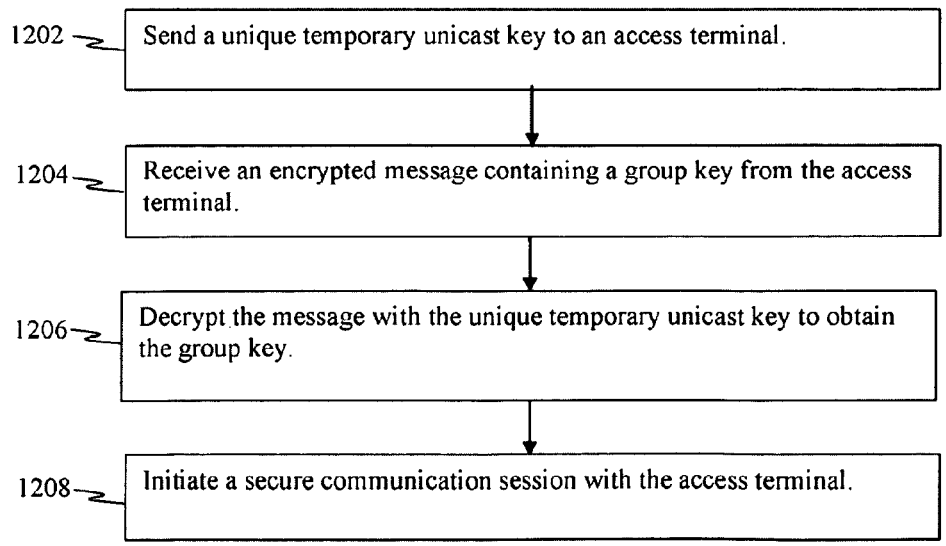
FIG. 12 is a flow diagram illustrating a method operational in an access node for joining an active set of access nodes associated with an access terminal.

FIG. 12 is a flow diagram illustrating a method operational in an access node for joining an active set of access nodes associated with an access terminal. The access node may send a unique temporary unicast key to an access terminal 1202. The access node may receive an encrypted message containing a group key from the access terminal 1204 and may decrypt the message with its unique temporary unicast key to obtain the group key 1206. A secure communication session may then be initiated with the access terminal 1208.

Figure 13:
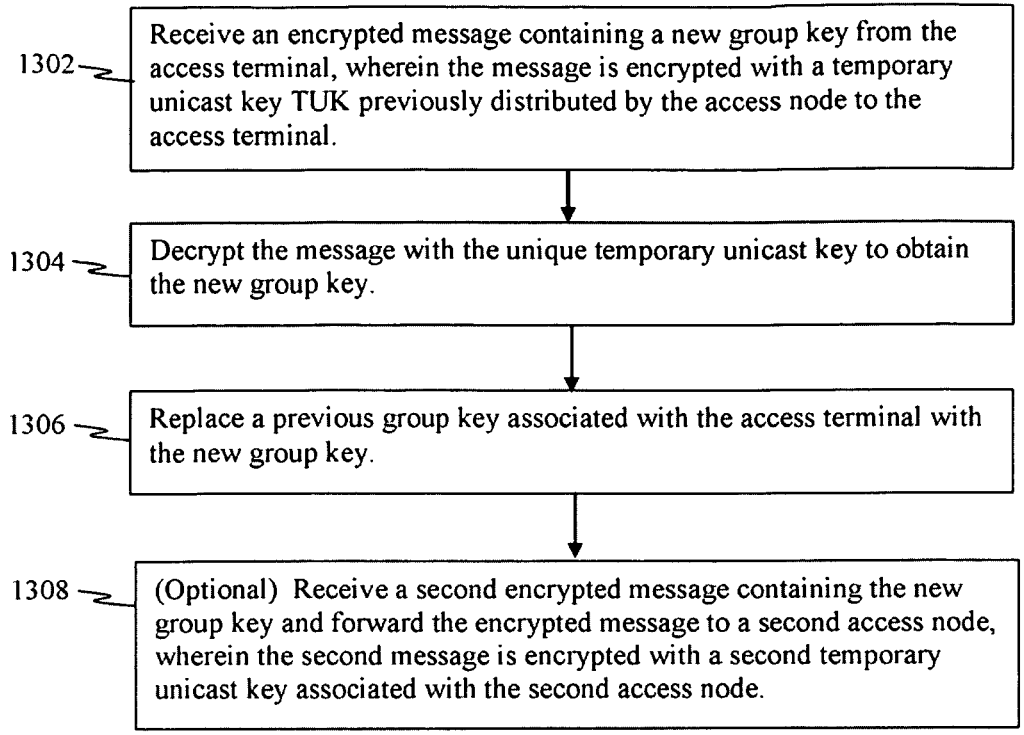
FIG. 13 is a flow diagram illustrating a method operational in an access node for replacing a group key for an active set associated with an access terminal.

FIG. 13 is a flow diagram illustrating a method operational in an access node for replacing a group key for an active set associated with an access terminal. Such method may be performed when an access node is removed from the active set. An access node may receive an encrypted message containing a new group key from the access terminal, wherein the message is encrypted with a temporary unicast key TUK previously distributed by the access node to the access terminal 1302. The access node then decrypts the message with the unique temporary unicast key to obtain the new group key 1304. The access node may then replace a previous group key associated with the access terminal with the new group key 1306. If the access node is a serving access node, it may also receive a second encrypted message containing the new group key and forward the encrypted message to a second access node (e.g., via a backend communication interface), wherein the second message is encrypted with a second temporary unicast key associated with the second access node 1308.

Figure 14:
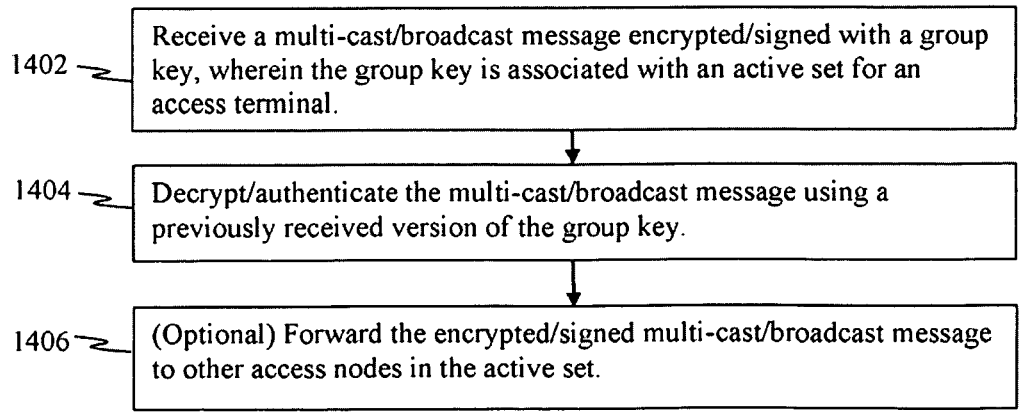
FIG. 14 is a flow diagram illustrating a method operational in an access node for receiving and decrypting a multi-cast message from an access terminal.

FIG. 14 is a flow diagram illustrating a method operational in an access node for receiving and decrypting/authenticating a multi-cast message from an access terminal. The access node may receive a multi-cast/broadcast message encrypted/signed with a group key from the access terminal, wherein the group key is associated with an active set for the access terminal 1402. The access node may decrypt/authenticate the multi-cast/broadcast message using a previously received version of the group key 1404. If the access node is a current serving access node, it may also forward the encrypted/signed multi-cast/broadcast message to other access nodes in the active set 1406.

Figure 15:
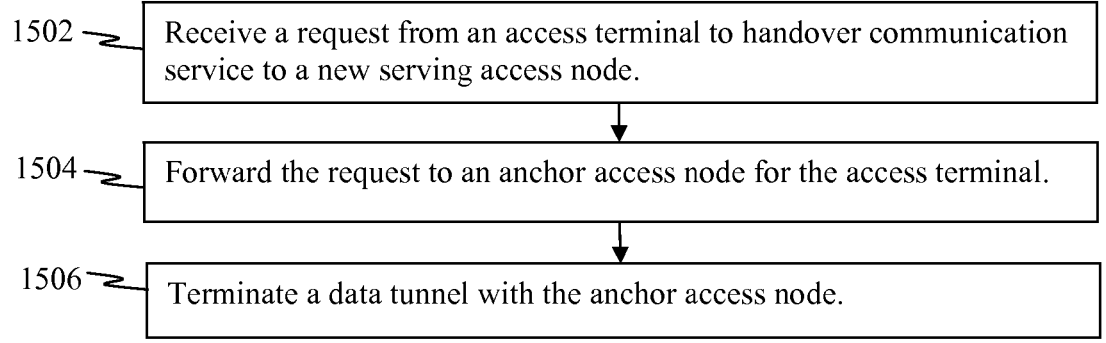
FIG. 15 is a flow diagram illustrating a method operation in a current serving access node to facilitate a secure handover of communication services to a new serving access node.

FIG. 15 is a flow diagram illustrating a method operation in a current serving access node to facilitate a secure handover of communication services to a new serving access node. The current serving access node may receive a request from an access terminal to handover its communication service (e.g., a communication link, a communication session, etc.) to a new serving access node 1502. The current serving access node may then forward the request to an anchor access node for the access terminal 1504. A data tunnel between the current serving access node and the anchor access node may then be terminated. This method may illustrate a handover from a centralized anchor node as illustrated in FIG. 1.

In an alternative configuration (illustrated in FIG. 2), instead of terminating a data tunnel with the anchor access node, the current serving access node may simply establish a data tunnel with the new serving access node.

Figure 16:
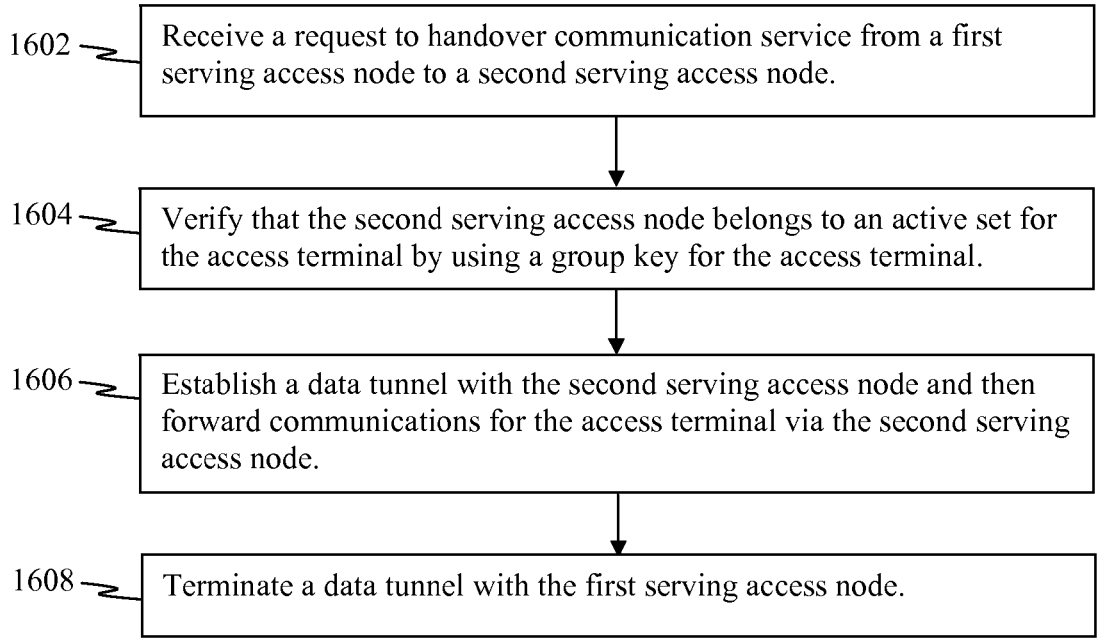
FIG. 16 is a flow diagram illustrating a method operational in an anchor access node to facilitate secure communication forwarding to different serving access nodes for a particular access terminal.

FIG. 16 is a flow diagram illustrating a method operational in an anchor access node to facilitate secure communication forwarding to different serving access nodes for a particular access terminal. The anchor access node may receive a request to handover communication service from a first serving access node to a second serving access node 1602. The anchor access node may verify that the second serving access node belongs to an active set for the access terminal by using a group key for the access terminal 1604. The group key may be known to the access nodes that are members of the active set for the access terminal. For instance, the anchor access node may use the group key to authenticate the second serving access node. If the second serving access node is verified, the anchor access node may establish a data tunnel with the second serving access node and then forward communications for the access terminal via the second serving access node 1606. The anchor access node may also terminate a data tunnel with the first serving access node 1608.

Figure 17:
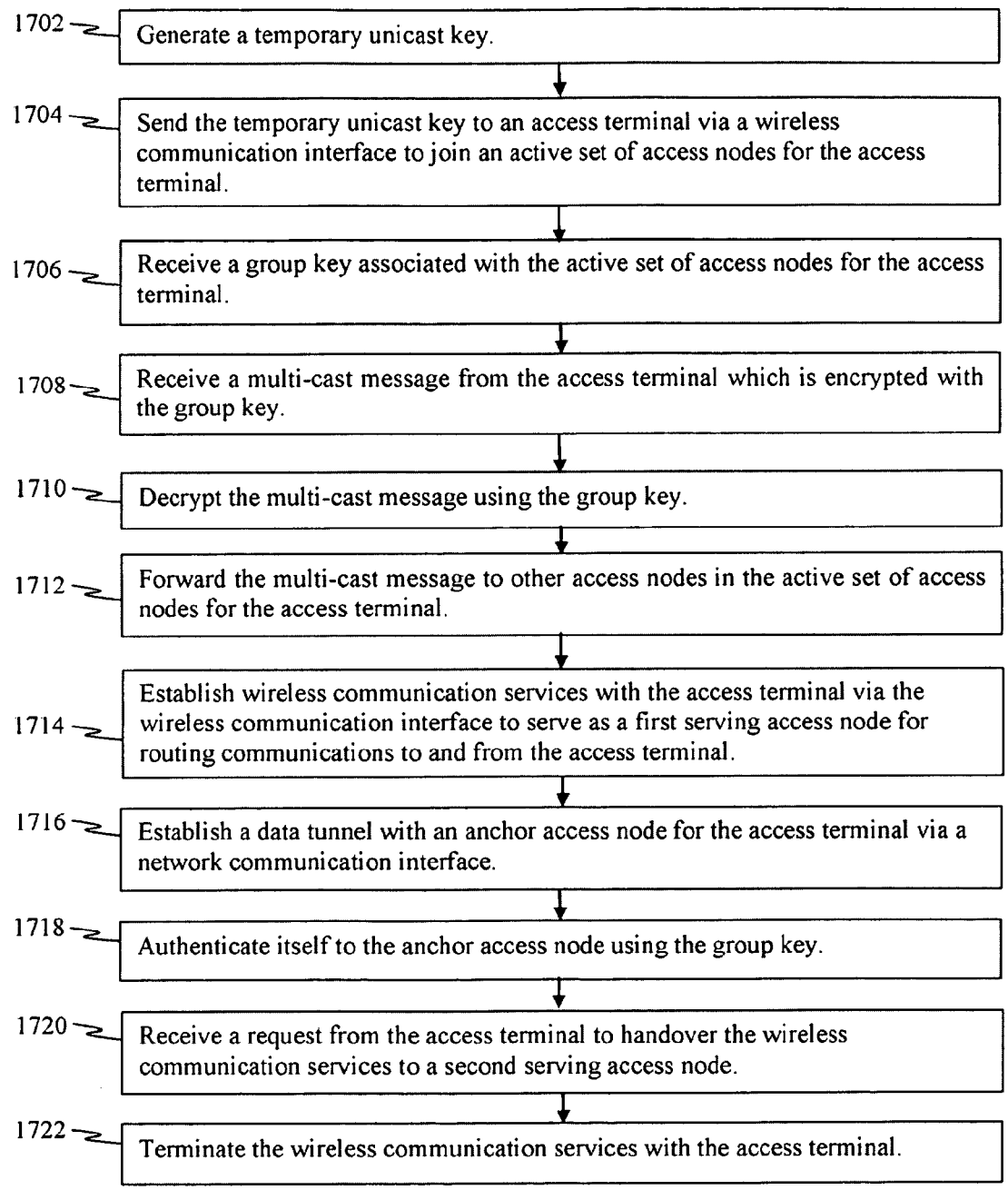
FIG. 17 is a flow diagram illustrating a method operational on an access node for facilitating secure multi-cast message distribution from the access terminal to one or more access nodes.

FIG. 17 is a flow diagram illustrating a method operational on an access node for facilitating secure multi-cast message distribution from the access terminal to one or more access nodes. The access node may generate a temporary unicast key 1702 and send the temporary unicast key to an access terminal via a wireless communication interface to join an active set of access nodes for the access terminal 1704. In response, the access node may receive a group key associated with the active set of access nodes for the access terminal 1706. Subsequently, the access terminal may receive a multi-cast message from the access terminal which is encrypted with the group key 1708, decrypt the multi-cast message using the group key 1710, and/or forward the multi-cast message to other access nodes in the active set of access nodes for the access terminal 1712.

The access node may also establish wireless communication services with the access terminal via the wireless communication interface to serve as a first serving access node for routing communications to and from the access terminal 1714. The access node may also establish a data tunnel with an anchor access node for the access terminal via a network communication interface 1716 and authenticate itself to the anchor access node using the group key 1718.

The access node may also receive a request from the access terminal to handover the wireless communication services to a second serving access node 1720 and terminate the wireless communication services with the access terminal 1722.

In one example, rather than obtaining or negotiating new keys when an access terminal moves to a new access node, an active set of keys is maintained by the access terminal. That is, the access terminal may simultaneously or concurrently establish security associations (e.g., keys) with a plurality of access nodes within a sector, area, or region. The access nodes with which the access terminal maintains such simultaneous or concurrent security associations (e.g., keys) are referred to as an "active set" of access nodes. Each time a new access node is added to the active set of an access terminal, the access terminal may transmit a group key to the new access node.

One or more of the components, steps, and/or functions illustrated in FIGS. 1, 2, 3, 4, 5, 6, 7, 8, 9, 10, 11, 12, 13, 14, 15, 16 and/or 17 may be rearranged and/or combined into a single component, step, or function or embodied in several components, steps, or functions. Additional elements, components, steps, and/or functions may also be added without departing from the invention. The apparatus, devices, and/or components illustrated in FIGS. 1, 2, 4, 5 and/or 11 may be configured to perform one or more of the methods, features, or steps described in FIGS. 3, 6, 7, 8, 9, 12, 13, 14, 15, 16 and/or 17. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static access nodes.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. An access terminal comprising:
a communication interface for communicating with at least one access node;
a processing circuit coupled to the communication interface, the processing circuit configured to maintain an active set list of access nodes that are in an active set for the access terminal, where the access terminal unilaterally selects which access node from the active set list of access nodes to use as a serving access node for facilitating wireless communication to and from the access terminal;
obtain a temporary unicast key for each access node in the active set;
generate a first group key for communication between the access terminal and the access nodes in the active set;
encrypt the first group key with a first temporary unicast key for a first access node in the active set;
send the encrypted first group key to the first access node;
encrypt the first group key with other temporary unicast keys for other access nodes in the active set; and
send each of the encrypted first group key to a corresponding access node with which temporary unicast key it was encrypted.

2. The access terminal of claim 1, wherein each of the temporary unicast keys are pairwise temporary unicast keys known to both the access terminal and a corresponding access node.

3. The access terminal of claim 1, wherein the processing circuit is further configured to:
unilaterally scan for access nodes via the communication interface;
add one or more access nodes to the active set of access nodes as they are identified; and
establish unique temporary unicast keys with each of the access nodes as they are added to the active set.

4. The access terminal of claim 1, wherein the processing circuit is further configured to:
replace the first group key with a second group key when an access node is removed from the active set; and
distribute encrypted versions of the second group key to the access nodes in the active set, wherein the encrypted versions of the second group key are encrypted with the temporary unicast keys for each access node in the active set.

5. The access terminal of claim 1, wherein the processing circuit is further configured to:
autonomously select an access node from the active set as a current serving access node for wireless communication services via the communication interface, wherein wireless communications to and from the access terminal are routed via the serving access node.

6. The access terminal of claim 5, wherein the processing circuit is further configured to:
determine whether a different access node in the active set can provide better wireless communication services than the current serving access node; and
unilaterally switch communication services from the current serving access node to a new serving access node if the new serving access node provides better wireless communication services than the current serving access node.

7. The access terminal of claim 1, wherein the processing circuit is further configured to:
send a multi-cast message encrypted with the first group key.

8. The access terminal of claim 1, wherein the processing circuit is further configured to:
send a multi-cast message signed with the first group key.

9. A method operational on an access terminal, comprising:
maintaining an active set list of access nodes that are in an active set for the access terminal where the access terminal unilaterally selects which access node from the active set list of access nodes to use as a serving access node for facilitating wireless communication to and from the access terminal;
obtaining a temporary unicast key for each access node in the active set;
generating a first group key for communication between the access terminal and the access nodes in the active set;
encrypting the first group key with a first temporary unicast key for a first access node in the active set;
sending the encrypted first group key to the first access node,
encrypting the first group key with other temporary unicast keys for other access nodes in the active set; and
sending each of the encrypted first group keys to a corresponding access node with which temporary unicast key it was encrypted.

10. The method of claim 9, further comprising:
scanning for access nodes;
adding one or more access nodes to the active set of access nodes as they are identified; and
establishing unique temporary unicast keys with each of the access nodes as they are added to the active set.

11. The method of claim 9, further comprising:
replacing the first group key with a second group key when an access node is removed from the active set; and
distributing encrypted versions of the second group key to the access nodes in the active set, wherein the encrypted versions of the second group key are encrypted with the temporary unicast keys for each access node in the active set.

12. The method of claim 9, further comprising:
unilaterally selecting an access node from the active set as a current serving access node for wireless communication services, wherein wireless communications to and from the access terminal are routed via the serving access node.

13. The method of claim 12, further comprising:
determining whether a different access node in the active set can provide better wireless communication services than the current serving access node; and
unilaterally switching communication services from the current serving access node to a new serving access node if the new serving access node provides better wireless communication services than the current serving access node.

14. The method of claim 9, further comprising:
sending a multi-cast message encrypted with the first group key.

15. The method of claim 9, further comprising:
sending a multi-cast message signed with the first group key.

16. An access terminal comprising:
means for maintaining an active set list of access nodes that are in an active set for the access terminal, where the access terminal unilaterally selects which access node from the active set list of access nodes to use as a serving access node for facilitating wireless communication to and from the access terminal;
means for obtaining a temporary unicast key for each access node in the active set;
means for generating a first group key for communication between the access terminal and the access nodes in the active set;
means for encrypting the first group key with a first temporary unicast key for a first access node in the active set;
means for sending the encrypted first group key to the first access node;
means for encrypting the first group key with other temporary unicast keys for other access nodes in the active set; and
means for sending each of the encrypted first group keys to a corresponding access node with which temporary unicast key it was encrypted.

17. The access terminal of claim 16, further comprising:
means for scanning for access nodes;
means for adding one or more access nodes to the active set of access nodes as they are identified; and
means for establishing unique temporary unicast keys with each of the access nodes as they are added to the active set.

18. The access terminal of claim 16, further comprising:
means for replacing the first group key with a second group key when an access node is removed from the active set; and
means for distributing encrypted versions of the second group key to the access nodes in the active set, wherein the encrypted versions of the second group key are encrypted with the temporary unicast keys for each access node in the active set.

19. The access terminal of claim 16, further comprising:
means for sending a multi-cast message encrypted with the first group key.

20. A non-transitory computer-readable medium comprising instructions for facilitating secure multi-cast message distribution from an access terminal to one or more access nodes, which when executed by a processor of the access terminal causes the processor to:

maintain an active set list of access nodes that are in an active set for the access terminal, where the access terminal unilaterally selects which access node from the active set list of access nodes to use as a serving access node for facilitating wireless communication to and from the access terminal;

obtain a temporary unicast key for each access node in the active set;

generate a first group key for communication between the access terminal and the access nodes in the active set;

encrypt the first group key with a first temporary unicast key for a first access node in the active set;

send the encrypted first group key to the first access node;

encrypt the first group key with other temporary unicast keys for other access nodes in the active set; and send each of the encrypted first group keys to a corresponding access node with which temporary unicast key it was encrypted.

21. The non-transitory computer-readable medium of claim 20 further comprising instructions which when executed by a processor causes the processor to scan for access nodes;

add one or more access nodes to the active set of access nodes as they are identified; and establish unique temporary unicast keys with each of the access nodes as they are added to the active set.

22. The non-transitory computer-readable medium of claim 20 further comprising instructions which when executed by a processor causes the processor to replace the first group key with a second group key when an access node is removed from the active set; and distribute encrypted versions of the second group key to the access nodes in the active set, wherein the encrypted versions of the second group key are encrypted with the temporary unicast keys for each access node in the active set.

23. The non-transitory computer-readable medium of claim 20 further comprising instructions which when executed by a processor causes the processor to send a multi-cast message encrypted with the first group key.

24. The non-transitory computer-readable medium of claim 20 further comprising instructions which when executed by a processor causes the processor to send a multi-cast message signed with the first group key.

25. A circuit of an access terminal for facilitating secure multi-cast message distribution from an-the access terminal to one or more access nodes, wherein the circuit is configured to:

maintain an active set list of access nodes that are in an active set for the access terminal, where the access terminal unilaterally selects which access node from the active set list of access nodes to use as a serving access node for facilitating wireless communication to and from the access terminal;

obtain a temporary unicast key for each access node in the active set;

generate a first group key for communication between the access terminal and the access nodes in the active set;

encrypt the first group key with a first temporary unicast key for a first access node in the active set;

send the encrypted first group key to the first access node;

replace the first group key with a second group key when an access node is removed from the active set; and distribute encrypted versions of the second group key to the access nodes in the active set, wherein the encrypted versions of the second group key are encrypted with the temporary unicast keys for each access node in the active set.

26. The circuit of claim 25, wherein the circuit is further configured to send a multi-cast message encrypted with the first group key.

27. An access node comprising:

a wireless communication interface for communicating with at least one access terminal; and a processing circuit coupled to the wireless communication interface, the processing circuit configured to generate a temporary unicast key;

send the temporary unicast key to an access terminal to join an active set of access nodes for the access terminal;

receive, from the access terminal, a group key generated by the access terminal for communication between the access terminal and the active set of access nodes for the access terminal;

receive a broadcast message from the access terminal which is encrypted with the group key; and decrypt the broadcast message using the group key, wherein the access terminal unilaterally selects which access node from the active set of access nodes to use as a serving access node for facilitating wireless communication to and from the access terminal.

28. The access node of claim 27, wherein the processing circuit is further configured to:

forward the broadcast message to other access nodes in the active set of access nodes for the access terminal.

29. The access node of claim 28, further comprising:

a network communication interface for communicating with other access nodes, wherein the forwarded broadcast message is sent over the network communication interface.

30. The access node of claim 27, wherein the processing circuit is further configured to:

receive a broadcast message from the access terminal which is signed with the group key; and authenticate the broadcast message using the group key.

31. The access node of claim 27, wherein the processing circuit is further configured to:

establish wireless communication services with the access terminal, per a request by the access terminal, via the wireless communication interface to serve as a first serving access node for routing communications to and from the access terminal.

32. The access node of claim 31, wherein the processing circuit is further configured to:

receive a request from the access terminal to handover the wireless communication services to a second serving access node; and terminate the wireless communication services with the access terminal.

33. The access node of claim 32, wherein the processing circuit is further configured to:

per a request by the access terminal, establish a data tunnel with an anchor access node for the access terminal via a network communication interface.

34. The access node of claim 27, wherein the processing circuit is further configured to authenticate the access node to an anchor access node using the group key.

35. A method operational on an access node, comprising:

generating a temporary unicast key;

sending the temporary unicast key to an access terminal to join an active set of access nodes for the access terminal;

receiving, from the access terminal, a group key generated by the access terminal for communication between the access terminal and the active set of access nodes for the access terminal;

receiving a broadcast message from the access terminal which is encrypted with the group key; and decrypting the broadcast message using the group key, wherein the access terminal unilaterally selects which access node from the active set of access nodes to use as a serving access node for facilitating wireless communication to and from the access terminal.

36. The method of claim 35, further comprising: forwarding the broadcast message to other access nodes in the active set of access nodes for the access terminal.

37. The method of claim 35, further comprising:

receiving a broadcast message from the access terminal which is signed with the group key; and authenticating the broadcast message using the group key.

38. The method of claim 35, further comprising:

per a request by the access terminal, establishing wireless communication services with the access terminal via a wireless communication interface to serve as a first serving access node for routing communications to and from the access terminal.

39. The method of claim 38, further comprising:

receiving a request from the access terminal to handover the wireless communication services to a second serving access node; and terminating the wireless communication services with the access terminal.

40. The method of claim 38, further comprising:

establishing a data tunnel with an anchor access node for the access terminal via a network communication interface.

41. The method of claim 35, further comprising:

authenticating the access node to an anchor access node using the group key.

42. An access node, comprising:

means for generating a temporary unicast key;

means for sending the temporary unicast key to an access terminal via a wireless communication interface to join an active set of access nodes for the access terminal;

means for receiving, from the access terminal, a group key generated by the access terminal for communication between the access terminal and the active set of access nodes for the access terminal;

means for receiving a multi-cast message from the access terminal which is encrypted with the group key; and means for decrypting the multi-cast message using the group key, wherein the access terminal unilaterally selects which access node from the active set of access nodes to use as a serving access node for facilitating wireless communication to and from the access terminal.

43. The access node of claim 42, further comprising: means for forwarding the multi-cast message to other access nodes in the active set of access nodes for the access terminal per a request by the access terminal.

44. The access node of claim 42, further comprising:

means for establishing wireless communication services with the access terminal, per a request by the access terminal, to serve as a first serving access node for routing communications to and from the access terminal.

45. The access node of claim 44, further comprising:

means for receiving a request from the access terminal to handover the wireless communication services to a second serving access node; and means for terminating the wireless communication services with the access terminal.

46. The access node of claim 42, further comprising:

means for establishing a data tunnel, per a request by the access terminal, with an anchor access node for the access terminal via a network communication interface; and means for authenticating the access node to the anchor access node using the group key.

47. A non-transitory computer-readable medium comprising instructions for facilitating secure multi-cast message distribution from an access terminal to one or more access nodes, which when executed by a processor causes the processor to:

generate a temporary unicast key;

send the temporary unicast key to an access terminal via a wireless communication interface to join an active set of access nodes for the access terminal;

receive, from the access terminal, a group key generated by the access terminal for communication between the access terminal and the active set of access nodes for the access terminal;

receive a multi-cast message from the access terminal which is encrypted with the group key; and decrypt the multi-cast message using the group key, wherein the access terminal unilaterally selects which access node from the active set of access nodes to use as a serving access node for facilitating wireless communication to and from the access terminal.

48. The non-transitory computer-readable medium of claim 47 further comprising instructions which when executed by a processor causes the processor to forward the multi-cast message to other access nodes in the active set of access nodes for the access terminal.

49. The non-transitory computer-readable medium of claim 47 further comprising instructions which when executed by a processor causes the processor to per a request by the access terminal, establish wireless communication services with the access terminal via the wireless communication interface to serve as a first serving access node for routing communications to and from the access terminal.

50. The non-transitory computer-readable medium of claim 47 further comprising instructions which when executed by a processor causes the processor to receive a request from the access terminal to handover the wireless communication services to a second serving access node; and terminate the wireless communication services with the access terminal.

51. The non-transitory computer-readable medium of claim 47 further comprising instructions which when executed by a processor causes the processor to per a request by the access terminal, establish a data tunnel with an anchor access node for the access terminal via a network communication interface; and authenticate the access node to the anchor access node using the group key.

52. A circuit for facilitating secure multi-cast message distribution from an access terminal to one or more access nodes, wherein the circuit is configured to:

generate a temporary unicast key;

send the temporary unicast key to an access terminal via a wireless communication interface to join an active set of access nodes for the access terminal;

receive, from the access terminal, a group key generated by the access terminal for communication between the access terminal and the active set of access nodes for the access terminal;
receive a multi-cast message from the access terminal which is encrypted with the group key; and
decrypt the multi-cast message using the group key,
wherein the access terminal unilaterally selects which access node from the active set of access nodes to use as a serving access node for facilitating wireless communication to and from the access terminal.

53. The circuit of claim 52, wherein the circuit is further configured to forward the multi-cast message to other access nodes in the active set of access nodes for the access terminal.

54. The circuit of claim 52, wherein the circuit is further configured to per a request by the access terminal, establish wireless communication services with the access terminal via the wireless communication interface to serve as a first serving access node for routing communications to and from the access terminal.

55. The circuit of claim 52 further comprising instructions which when executed by a processor causes the processor to
per a request by the access terminal, establish a data tunnel with an anchor access node for the access terminal via a network communication interface; and
authenticate the access node to the anchor access node using the group key.

* * * * *